(12) United States Patent
Mizutani et al.

(10) Patent No.: US 8,305,907 B2
(45) Date of Patent: Nov. 6, 2012

(54) NETWORK SYSTEM AND DATA TRANSFER DEVICE

(75) Inventors: Masahiko Mizutani, Kokubunji (JP); Atsushi Iwamura, Yokohama (JP); Yoshihiro Ashi, Yokohama (JP); Kenichi Sakamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/087,336

(22) PCT Filed: Dec. 28, 2006

(86) PCT No.: PCT/JP2006/326242
§ 371 (c)(1),
(2), (4) Date: Oct. 23, 2008

(87) PCT Pub. No.: WO2007/077923
PCT Pub. Date: Jul. 12, 2007

(65) Prior Publication Data
US 2009/0201819 A1    Aug. 13, 2009

(30) Foreign Application Priority Data

Jan. 4, 2006  (JP) ................................. 2006-000033
Nov. 22, 2006  (JP) ................................. 2006-314984

(51) Int. Cl.
*G01R 31/08*  (2006.01)
*H04J 1/16*  (2006.01)
*H04L 12/28*  (2006.01)

(52) U.S. Cl. ...................... 370/241.1; 370/252; 370/254; 370/389

(58) Field of Classification Search .................. 370/241, 370/252, 253, 254, 466, 230, 432, 390, 395.31, 370/392, 389, 400, 401, 408, 431, 471, 255, 370/256
See application file for complete search history.

(56) References Cited

U.S. PATENT DOCUMENTS 6,690,892 B1 * 2/2004 Effenberger .................. 398/168
(Continued)

FOREIGN PATENT DOCUMENTS

JP    9-162920    6/1997
(Continued)

OTHER PUBLICATIONS

International Search Report of PCT/JP2006/326242 mailed Jan. 30, 2007.

(Continued)

*Primary Examiner* — Nittaya Juntima
*Assistant Examiner* — Samina Choudhry
(74) *Attorney, Agent, or Firm* — Crowell & Moring LLP

(57) ABSTRACT

To prevent, in using a multicast DA in an OAM frame, an increase in the network bandwidth usage and in the load of node processing and a degradation of the network reliability caused by a frame being transmitted to all routes in a broadcast domain. A MAC address and other basic frame information and the MEGID are associated with each other, and the MEGID information is added to the OAM frame, and these information are transmitted from an edge node serving as an end point of an ME. In a relay node of the ME, a route control table used for OAM frame control is provided, and a filter is generated by snooping of the OAM frame. Furthermore, when the relay node does not support the OAM function, the MEGID is denoted by a VLAN tag and the route control is made using the snooping function of each VLAN tag.

14 Claims, 22 Drawing Sheets

U.S. PATENT DOCUMENTS

| | | | |
|---|---|---|---|
| 6,778,532 B1* | 8/2004 | Akahane et al. | 370/392 |
| 7,068,654 B1* | 6/2006 | Joseph et al. | 370/392 |
| 7,120,792 B1* | 10/2006 | Jacobson et al. | 713/153 |
| 7,821,949 B2* | 10/2010 | Mohan et al. | 370/241.1 |
| 2005/0099954 A1* | 5/2005 | Mohan et al. | 370/241.1 |
| 2005/0144467 A1 | 6/2005 | Yamazaki | |
| 2005/0157741 A1 | 7/2005 | Wu et al. | |
| 2005/0265356 A1 | 12/2005 | Kawarai et al. | |
| 2006/0153220 A1* | 7/2006 | Elie-Dit-Cosaque et al. | 370/432 |
| 2006/0203717 A1* | 9/2006 | Puppa et al. | 370/216 |
| 2009/0116396 A1* | 5/2009 | Regan et al. | 370/248 |

FOREIGN PATENT DOCUMENTS

| | | |
|---|---|---|
| JP | 2005-197823 | 7/2005 |
| JP | 2005-328318 | 11/2005 |

OTHER PUBLICATIONS

Takashi Kikuzawa et al., "Prototyping of Rapid Protection Switching Function for Layer 2 Ethernet", The Institute of Electronics, Information and Communication Engineers, IEICE Technical Report, Aug. 2005, pp. 17-20, with English abstract.

Atsushi Iwamura, "Introduction of Detail Mechanism of ther OAM (Y.17ethoam)", The Institute of Electronics, Information and Communication Engineers, IEICE Technical Report, Oct. 2004, pp. 35-40, with English abstract.

Hiroshi Ohta, "Standardization Status on OAM and QoS Issues for Carrier-Class Ethernet", The Institute of Electronics, Information and Communication Engineers, IEICE Technical Report, Oct. 2004, pp. 29-34, with English abstract.

"Virtual Bridged Local Area Networks—Amendment 5: Connectivity Fault Management", IEEE, Dec. 6, 2005, pp. a-h, i-vi and 1-122.

"Draft Recommendation G.8031 (Ethernet Protection Switching)", Editors G.8031, Nov. 28, 2005-Dec. 2, 2005, pp. 1-33.

"Draft Recommendation Y.17ethoam—OAM Functions and Mechanisms for Ethernet Based Networks", International Telecommunication Union, Telecommunication Standardization Sector, 2005-2008, pp. 1-71.

Extended European Search Report mailed Sep. 10, 2009.

Suzuki et al., "Global Area Virtual Ethernet Services implemented with Backbone Provider Bridges", The Institute of Electronics, Information and Communication Engineers, Technical Report of IEICE; NS2004-105, IN2004-64, CS2004-50 (Sep. 2004).

Official Action from Japan Patent Office issued Jan. 4, 2011 in Application No. 2007-552984 (4 pages) with a Brief English language Translation attached thereto (1 page).

Official Action from Japan Patent Office issued Oct. 8, 2010 in Application No. 2007-552984 (3 pages) with a Brief English language Translation attached thereto (1 page).

* cited by examiner

FIG. 12

| MAC ADDRESS OF MEP,MIP OF FRAME DESTINATION | MEGID |
|---|---|
|  | 1, 3 |
|  | 1 |
|  | 2 |
|  | 2, 5 |
|  | ····· |

| ME LEVEL (MULTICAST DA) 1201 | VLAN 1202 | RECEIVE PORT 1203 |
|---|---|---|
| 1 | 1 | |
| 1 | 2 | |
| 2 | 1 | |
| 2 | 3 | |
| 2 | 4 | |
| ... | ... | |

NETWORK SYSTEM AND DATA TRANSFER DEVICE

CROSS-REFERENCE TO RELATED APPLICATION

The present application claims priority from Japanese Patent Application No. 2006-000033 filed on Jan. 4, 2006 and Japanese Patent Application No. 2006-314984 filed on Nov. 22, 2006, the contents of which are hereby incorporated by reference into this application.

TECHNICAL FIELD

The present invention relates to a method of controlling transmission paths of maintenance/management information in a packet or frame transmission network. In particular, the present invention relates to a control of an OAM frame used in maintenance/management of the data link layer in the OSI reference model, and relates to a frame processing system that has a database in a node in order to support this control, and further relates to an OAM frame transfer route setup method that can be applied also when the existing device is used.

BACKGROUND ART

While there is an increased demand for a packet technology-based network, IP network services based on the next generation network (NGN) scheme are expected to be driven further in the future. As a vehicle in this scheme, a lower layer that is highly compatible with IP applications, such as Ethernet and MPLS (Multi-Protocol Label Switching), is required. On the other hand, in order for the NGN to serve as the next-generation infrastructure, a feeling of reliability and a feeling of security as the infrastructure are required and thus it is important to establish a network having quality and reliability comparable with the existing legacy network in both an access system and a relay system.

In such background, the OAM for Ethernet networks is already under study in each standardization organization. For the OAM (Operation, Administration, and Maintenance) regarding the Ethernet, a mechanism recommendation Y.17ethoam (Non-Patent Document 1) and a linear switching recommendation G.8031 (Non-Patent Document 2) are under study in ITU. Moreover, in IEEE, the mechanism of Ethernet OAM is under study in p802.1ag (Non-Patent Document 3). These organizations promote cooperation and are attempting to unify the concepts and the formats.

In maintaining a network as the concept for managing the network, the maintenance person needs to configure the maintenance range (i.e., maintenance entity). This maintenance range differs in topologies depending on the functionality of OAM and the management scope of the administrator. For example, in performing the linear switching, the maintenance range becomes a point-to-point configuration, while in checking the connectivity in the range of a certain domain, the maintenance range becomes a two dimensional-like configuration. The OAM flow needs to be run between the end points of this maintenance range. However, since the original Ethernet architecture is connectionless, a technique to identify a route at each node within the network is required.

The maintenance range (Maintenance Entity: ME) of Ethernet is a range in which an OAM packet flow is inserted and terminated. The ME is a name when the entities are in the form of point-to-point, while when the entities are managed in a plane, the ME is called a management entity group (MEGroup: MEG). MEG may be in the form of a plurality of point-to-points or a set of multipoints. Each MEG is managed using an MEGID identifier. The MEG exists within a management domain (VLAN (Virtual Local Area Network) or the like) that is distinguished by the service or the like.

In the Ethernet OAM, the ME is nested (a plurality of levels of maintenance entities (currently defined as 8 levels) can be configured for each maintenance range. The maintenance range of a lower level is included and defined in the range of the maintenance of an upper level), so that each ME is managed with an ME level identifier. At present, up to 8 levels can be obtained and the OAM flow is defined for each ME level. The ME identified by each ME level is independent from each other, and has filtering functions as follows.

a) In an OAM-flow inserting point, if an OAM packet entering from the outside is the OAM packet of an upper level, it is allowed to pass therethrough, and if it is the OAM packet of the same or lower level, it is discarded.

b) In an OAM-flow separation point, if an OAM packet from the inside of the ME is the OAM packet of an upper level, it is allowed to pass therethrough, and if it is the OAM packet of the same or lower level, it is terminated appropriately.

As the end point for terminating the OAM flow, an ME end point (MEP), and an ME intermediate point (MIP) are defined. The MEP terminates all the OAM flows for each ME level. On the other hand, the MIP terminates the OAM flow that is used in a specific range for each ME level. As the functionality of OAM, CC (Continuity Check) for connection check, switching (APS), AIS (Alarm Indication Signal), a loop back (LB), a link trace (LT), and the like are under study.

The functionality of OAM is roughly grouped into a function to be transmitted/received only between MEPs and a function that can be terminated at MIP. The former is called a proactive OAM because it is assumed to be configured mainly when a service starts. The latter is called a diagnosis OAM, an on-demand OAM, or the like because it is used in the diagnosis for fault isolation or the like. For example, CC, APS, AIS, or the like belong to the proactive OAM, while LB and LT are grouped into the diagnosis OAM. In particular, the periodically driven CC frame also contains other functionality of OAM, such as performance information, RDI (Remote Defect Indication) information, and the like, which are also used in the application for obtaining the configuration information at the time of initial connection and establishing a database (CC Database: CCDB).

For DA (Destination Address) of an OAM frame, a unicast or a multicast can be considered, however, from a viewpoint of an operator who manages the network, it is not preferable to use the unicast DA that is changed every time the equipment and materials are replaced. For this reason, the multicast is recommended except in special applications. The examples of the unicast include a LB request, a reply to LB, and a reply to LT. Moreover, a method has already been invented for identifying the ME level using the multicast DA. An ME level identifier field exists in the OAM frame, and is intended to be used as an auxiliary measure for identifying the DA, for the purpose of reducing the internal processing of an MPU and the like. Furthermore, MIP needs to allow the proactive OAM to pass therethrough without processing the frame (simple operation). In order to facilitate this operation, two types of DAs: DA for proactive OAM; and DA for diagnosis OAM, are defined. That is, 16 (=8 levels×2) types of multicast DAs are defined for the OAM.

Non-Patent Document 1: "Draft Recommendation Y.1731-OAM Functions and Mechanisms for Ethernet based Networks" ITU-T SG13, November 2005.

Non-Patent Document 2: "Draft Recommendation G.8031-Ethernet Protection Switching" ITU-T SG15, November 2005

Non-Patent Document 3: "Virtual Bridged Local Area Networks-Amendment 5: Connectivity Fault Management" IEEE P802.1ag/D5.2, December 2005

DISCLOSURE OF THE INVENTION

Problems to be Solved by the Invention

When the multicast DA is used in the OAM frame, it is treated as a broadcast frame on the OSI layer 2. Since the frame is transmitted to all the routes within a broadcast domain, the multicast DA cannot address the case you want to specify within a management domain the routes to be maintained. A problem arising from the broadcast is an increase in the network bandwidth usage and in the node processing load caused by a frame with the OAM information being transferred to other node. Thus, it is difficult for the administrator to obtain the accurate network operating condition. Moreover, a problem of reliability degradation of the network due to the transmission of the OAM information to other nodes may occur. Then, it is necessary to distinguish these OAM frames from the user data and perform the route control.

With the conventional switch, it is impossible to perform the route control to distinguish the OAM frame from the user data for the purpose of transferring the OAM frame only to an appropriate route.

Means for Solving the Problems

In order to make the OAM frame controllable independently of the user data, a route control table for the OAM frame control is provided in a relay node of the ME. In generating the table, a snooping function used for the OAM frame is used. The snooping function is a function to monitor an IGMP or MLD message and relay the multicast traffic to a port which a recipient is connecting to. With this function, the unwanted multicast traffic can be prevented from being relayed and the network can be used efficiently. Moreover, with regard to the OAM frame that does not include a field that is used in the frame control, in an edge node serving as the end point of the ME, a MAC address and other basic frame information and an OAM control field (MEGID field) are associated with each other and are given to the frame, which is then transmitted. Furthermore, in order to identify an OAM frame transfer range and a user data transfer range by using path identifiers, such as a VLAN tag and an MPLS label, and further to perform the route control using the snooping function in a relay node in the case where the relay node does not support the OAM function, the field (MEGID field) required for the OAM frame control is associated with these path identifiers to generate the OAM frame.

Effect of the Invention

Even when the multicast DA is used in applying the OAM, the flooding of a frame in a relay node can be prevented and the utilization efficiency in the bandwidth and in the CPU resource within a management domain can be improved.

Other objects and features and advantages of the invention will become apparent from the following description of the embodiments of the invention taken in conjunction with accompanying drawings.

BEST MODES FOR CARRYING OUT THE INVENTION

In order to identify a transit area of an OAM frame within a network management domain when a multicast address is used as the destination address of the OAM frame, we propose two types of methods: a method of providing a route control database within a node that supports the Ethernet OAM; and a method of using IGMP/MLD snooping. The former is advantageous in configuring a new network in the future, while the latter is advantageous as an addition of the OAM function in the existing network, and also as a transition measure to the construction of a network that supports the OAM function, and further as an inexpensive OAM function introduction means.

FIG. 1 shows an example of an ME configuration within a network management domain. The ME here is configured with the devices located at the boundary of the management domain as both ends, indicating a situation where this ME is configured as the only ME within the management domain. The nodes are connected using a data link layer protocol. As the representative protocol on the data link layer, Ethernet is enumerated. Hereinafter, an embodiment assuming Ethernet will be described, but other protocol may be used.

A network 1000 of this embodiment comprises edge nodes EN1$a$, 1$b$, and 3$a$ to 3$d$, and relay nodes 2$a$, 2$b$, and 3$e$. When terminals or servers 100$a$ and 100$b$ communicate with each other, a route from the edge node EN1$a$ through the relay node 2$a$ and relay node 2$b$ to the edge node 1$b$ and a route passing through the relay node 3$e$ are available. Here, a case where an OAM function is applied to the former route is illustrated. In this embodiment, the nodes EN1$a$, 1$b$, and the relay nodes 2$a$, 2$b$ on the OAM-applicable route are the nodes that support the Ethernet OAM function. Whether or not the other edge nodes 3$a$ to 3$d$ and relay node 3$e$ support the OAM doesn't matter.

On the above-described OAM-applicable route, ME (maintenance entity) for applying the OAM is configured. In order to do this, in the edge nodes 1$a$ and 1$b$, the OAM parameter including an MEP (MEG End Point) ID, an ME level, and an MEGID (ME Group ID) are set to a port to be managed, the port accommodating the above-described ME. Specifically, a database, in which the identifiers of logical/physical ports to be managed and the MEPID, ME level and MEGID that are assigned thereto, respectively, are associated with each other, is established. The MEP is an identifier indicative of an end point of the ME. The ME level indicates at which level among the OAM setup levels (8 levels) defined in the Ethernet OAM the OAM is performed to the relevant route. The ME is configured so as to belong to either one of the 8 levels. Moreover, the MEGID is an identifier for identifying a set of bundled plurality of MEs whose ME levels are the same. For the plurality of MEs included in the same MEGID, all of them need not have the same range (MEP with the same both ends). Moreover, all the MEs included in the MEGID need not belong to the same range. In the basic configuration, the physical port of the device accommodates one or more logical ports, and the logical port accommodates one or more ME levels, MEGIDs, and MEPs when it is a termination port of the ME in the OAM. The MEP indicates a termination point of an ME and identifies the ME level which the MEP itself belongs to. An OAM frame having an ME level equal to or lower than the level which the MEP itself belongs to is discarded in the MEP. Accordingly, an ME identified by a combination of MEPIDs and an MEGID indicative of a set thereof have a unique ME level, and the MEG in a management domain can be identified using a combination of the ME level and MEGID.

In the Ethernet OAM, a CC (Continuity Check) frame is used in order to monitor the state of a route to be managed. The CC frame is periodically transmitted from an MEP (end point of ME) to the counterpart MEP, and is used to check the connection state of the route (whether or not the CC frame can reach the counterpart, or whether or not the CC frame arrival intervals on the receiving side are maintained correctly, or the like). A multicast group address (DA; Destination Address) indicative of the ME level, a period field for defining a CC frame transmission period, an MEGID field, and an MEPID field are included in the CC frame. The CC frame format is defined in non-Patent Document 1.

The edge nodes EN1a, 1b constituting the route, in which ME is configured, records a correspondence between the ME level, MEGID, and MEPID included in the CC frame and configures CCDBs (CC Database; a table for recording identifiers, such as header information included in a received OAM frame) 10a, 10b. The CCDB is generated in a port where the MEP is configured. The parameter recorded in creating the CCDB are path identification information, such as a sender MAC address, the MEGID, the MEPID, and a VLAN tag. The CCDB is a topology database for the OAM. Here, since MEP is set up for each port, a correspondence between the MEPID included in a received CC frame and the receive port is learned in the CCDB. It is thus possible to select which port should be used for the transmission destination port of a CC frame heading for a certain MEPID, and the CCDB can be used in the route control of the CC frame. The configuration of the CCDB is described in non-Patent Document 1 and non-Patent Document 2.

In the relay nodes MN2a, 2b, the OAM frame is processed in accordance with the field definition of each OAM frame. Here, consider the route learning from the OAM frame including the MEGID field indicative of an OAM transit area among OAM frames. Note that, at present, only the CC frame corresponds to this, but the CC frame is a frame that is periodically transmitted to manage the state of a route, and thus the CC frame is assumed to exist in advance also in using other OAM function. For this reason, the frequency of transmitting the CC frame is extremely high even compared with the frequency of transmitting other OAM frame, and thus even when only the CC frame is subjected to the route control as it is, a sufficient saving effect of the bandwidth can be expected. A method of controlling other OAM frame will be described later.

Since a relay node does not have the CCDB (Non-Patent Document 1), it is not possible to perform the route control of the CC frame with reference to the CCDB, in the relay node. Then, for the purpose of controlling the CC frame, a table (hereinafter, referred to as a route control table) 20a, 20b including a correspondence between a port having received the CC frame, the ME level, and the MEGID is established in each node. This processing is performed using a CC frame learning function that is independent of the CCDB learning in the MEP.

On the OAM-applicable route, the CC frame is transmitted from the edge nodes EN1a, 1b at both ends of the ME, respectively. The transmission route (for each MEGID) of the CC frame that is received from one of the edge nodes can be identified from the receive port of the CC frame that is received from the other edge node. By repeating the CC frame learning from both directions in this manner, the transfer control tables 20a, 20b for the OAM frame control along the ME are established.

With the above-described method, the transfer route can be identified for each MEGID also in a relay node without the CCDB (specified in non-Patent Document 1), and therefore the OAM frame can be prevented from being broadcasted to other than the route to be monitored. Accordingly, the utilization of a network can be improved, and the processing load on a node that does not include the OAM-applicable port can be reduced.

FIG. 2 is a sequence showing a procedure to generate the OAM transfer control table in the network configuration of FIG. 1. In the network of FIG. 1, in order to specify the OAM frame transfer range only to the route to be managed, with reference to the CC frames transmitted from the devices at both ends of the route, a correspondence between the MEGID and ME level included therein and the receive port is learned. Here, the sequence is described focusing attention to one direction. The transfer route table generation processing for the backward direction can be also achieved using exactly the same procedure. Note that the one denoted as MEGID below may be read as MEID. This is because the ME itself can be identified with MEGID since in this embodiment the ME is single within the management domain.

Moreover, for the ME level information, a dedicated field therefor is defined in the OAM frame (non-Patent document 1), however, here, assume that each DA is defined for each ME level using a multicast DA (200a, 200b) in the OAM frame. Then, in the following description, the ME level information may be replaced with the DA of the OAM frame. In the OAM frame, the multicast group address is used in distinguishing the OAM frame from the user frame and in identifying the ME level.

In process 201, the ME is configured on the edge nodes 1a and 1b. Here, the configuration information on each node is as follows. In the edge nodes 1a and 1b, the OAM parameter including the IDs of MEPs which are both end points of the ME, the ID of MEG which the ME belongs to, and the ME level information indicative of the level of the MEG are configured for each OAM-applicable port. The configuration information is recorded on an OAM configuration information database (described later). In the relay nodes 2a and 2b, the OAM parameter including the information of the ME level which these relay nodes belong to are configured for each port.

After the OAM information is configured, in the edge node, the CC frame is generated in process 202 and transmitted to a port where the counterpart MEP is configured. In the adjacent node 2b having received a CC frame 203, in process 204, the identifier of the relevant receive port, the MEGID included in the received CC frame, and the ME level are learned and described on an OAM frame transfer control table (described later). Subsequently, the relay node 2a having received a CC frame 205 associates the port having received the relevant CC frame with the MEGID and ME level in the CC frame, and stores these in the OAM frame transfer control table, in process 206.

Also in the counterpart edge node 1a, the CCDB is established with reference to a received CC frame 207 in process 208. In the edge node 1a, in process 209, the received CC frame is terminated, and then it is checked whether or not the MEGID, the ME level, and the sender MEPID in the frame, and the CC frame transmission interval are correctly processed as the OAM parameter is configured. If the above-described information turned out to be wrong, an alarm indicative of each error is issued. Here, the method of processing the error and the alarm is not specified in the present invention.

As described earlier, also for the backward direction, exactly the same CC frame learning processing is performed. That is, the CC frame is generated and transmitted in the edge node 1a, and the MEGID, the ME level, and the receive port are associated with each other to configure a transfer control table in the relay nodes 2a, 2b. In the edge node 1b where the counterpart MEP is configured, the CCDB is set up, the OAM parameter indicated by the CC frame is checked, and then the processing is terminated.

FIG. 3 shows a sequence when an unwanted entry is deleted from the OAM frame transfer control table that is set up in the sequence of FIG. 2. For example, when the ME configuration is deleted in an edge node or a relay node constituting a path along the ME, the ME configured as point-to-point will lose the significance of existence and is deleted. In deleting the ME, a method is employed for deleting the configuration by an operator in each node, for example. Along with this, the entry of the OAM frame transfer control table is also deleted. As a method thereof, the table entry may be deleted individually in each node. However, a transfer control table configured by automatic learning can manage the expiration date and time of each entry using an aging process for each entry. Here, a method is shown in which an entry whose expiration date and time has expired is deleted using an aging timer function by using the fact that the CC frame does not exist after the ME deletion.

Consider the case where the setting of the ME is canceled first in the edge node 1b. The OAM frame transfer route 210 currently established along the ME is no longer needed due to the ME cancellation 301. Then, in the edge node 1b, a corresponding entry is deleted from the OAM frame transfer control table in process 302. Due to process 301, the CC frame to head for the counterpart edge node 1a from an edge node 1d is no longer transmitted. As a result, the relevant CC frame will not be received any more by the relay nodes 2a, 2b, and for the table entry established by the CC frame learning, the entry thereof will disappear along with the expiration of the aging timer in the order of the learning timing as in processes 303, 304, respectively.

Note that, in the counterpart edge node 1a, as the setting of the OAM parameter including the MEPID and MEGID set to the port is cancelled, the related entries of the CCDB and transfer control table in each node may be deleted without waiting for the aging timer to expire.

Although only one direction is described in FIG. 3, the backward direction is described in the same way. For the MEP information (CCDB entry), according to the current Recommendation the transmission side MEP is distinguished from the receiving side MEP. For this reason, the deletion of one direction of entries will not affect the OAM control in the other direction. Then, in order to delete all MEs on the route in this embodiment, the process 301 to process 306 may be carried out in a similar manner also for the backward direction.

By performing the aging process, it is possible to prevent the unwanted route control information from being kept retained, even in the event the management of ME should be cancelled.

FIG. 4 shows an OAM frame format including the multicast DA. The OAM frame comprises an OAM common header and an information field specific to each OAM function.

In the OAM mechanism that determines the ME level based on the multicast DA, the OAM being addressed by the present invention, the transmission destination cannot be identified from the destination address. Moreover, the multicast group in the OAM frame does not indicate a set of nodes (ports). Due to such circumstances, it is preferable that the transmission destination port of the OAM frame be identified not by the MAC address but by the MEPID, and the ID of the MEG that bundles MEs constituting the MEG be described in the OAM frame.

In the view, a multicast address indicative of the ME level of the OAM frame is described in DA 401, while in the information field of each OAM function, MEGID 406 is described. Here, a port, which is identified by the MAC address according to the present Recommendation, performs information substitution in a node serving as the sender of the relevant frame with reference to the table for associating the MAC address with the MEGID.

Other fields comply with the format described in the Recommendation (Non-Patent Document 1). The address of the sender of the frame is included in an SA field 402, and a code number indicating that the relevant frame is the OAM frame is included in an Ether Type field 403, and further an ME level 404 and an identifier Op Code 405 indicative of the OAM type of the relevant frame are included in an OAM frame common header.

FIG. 5 is a functional block diagram showing the configuration of a frame transmission device that supports the Ethernet OAM. As the main features, the frame transmission device includes OAM information 540, a CCDB 541, an OAM frame transmission function 542, and a CCDB 550.

An edge node 1 comprises a device control unit 500, I/O controllers 510-n (n=1, 2, . . . ), and a switch 520.

The device control unit is provided with a processor 501, a memory 502, and an I/O controller 503. The I/O controller 503 has a function to determine whether the information transmitted from the switch 520 is stored into the memory 502 or is notified to the processor 501. Moreover, upon receipt of a notification from the processor 501, the I/O controller 503 reads a frame from an OAM frame insertion processing unit in the memory and transfers this to the switch 520. In the memory 502, a route control table 530 for storing the routing information or switching information is retained. The route control table 530 is referred to through the switch 520 in order to set the transmission destination of a received frame. In the memory 502, further an OAM information DB 540 and a CCDB 541 are retained. The OAM information including the MEPID, ME level, and MEGID assigned to each port of a node are stored in the OAM information DB. Management topology information which the local node established based on the CC frame received from other node, the management topology information using the MEPID, is retained in the CCDB.

The I/O signal processing unit 510 comprises a physical port 511, an input signal controller 512, an output signal controller 516, a switch 513, a processor 514, and a memory 515. A frame received in the physical port 511 is subjected to the multiple processing, header analysis, header conversion processing, and internal header processing in the input controller 512, and is then transmitted to the switch 513. Here, for the header conversion method, the input signal controller 512 may refer to those stored in the memory 502 of the device control unit, or the processing method may be separately described in the memory 515 of the I/O controller 510. The switch 513 determines the transfer destination of each frame based on the frame information received from the input signal controller 512. Also here, in determining the frame transfer destination, the memory of the device control unit may be referred to or the memory 515 of the I/O signal processing unit may be referred to. Here, there is shown a configuration, in which when an appropriate transmission destination cannot be determined referring to the memory 515, a frame is transferred to the higher layer switch 520 and the switch 520 determines the destination route. In accordance with the processing of the input signal controller 512, the switch 515 makes decision whether to notify the processor 514 of the frame processing, or to retain the frame information in the memory 515, or to transfer the frame information to the switch 520. The removal of the internal header, and the shaping and timing control of the transmission frame are performed in the output signal controller.

A process example in the case where a frame turned out to be the CC frame through the frame analysis in the input signal controller is described. In the input signal controller, in order to read the OAM information from the relevant frame, the frame is temporarily stored in the memory 515, and the internal header indicating that the OAM information is to be reflected on the CCDB 550 in the memory 515 is given to the frame. In the switch 513, the frame is transferred to the memory 515 and the completion of storing the frame is notified to the processor 514. Moreover, in this embodiment, the CCDB 541 for putting together and managing the CCDB information of the whole nodes is provided in the device control unit 500, and the switch 513 transfers the relevant frame also to the switch 520. The switch 520 stores the relevant frame in the memory 502 and also notifies the processor 501 of this fact. Whether the CC frame is to be terminated or to be transferred to other node is determined by the processor 514 of the I/O signal processing unit 510 or by the processor 501 in the device control unit 500. Which is determined differs depending on whether or not there is the MEGID information corresponding to the received frame, among the MEGID information retained in the CCDB 550 and CCDB 541.

Of course, the CCDB may be retained only in the device control unit 500 so as to be referred to from each I/O signal processing unit 510-i. Moreover, a method may be employed for recording all the OAM information into the CCDB 541 once, followed by reflecting the necessary information on the individual CCDB 550 as required. With these methods, the OAM information concentrates on the device control unit, and it is therefore possible to prevent the conflict in the information retained in the both databases from occurring due to the timing or the like of the database update processing. Moreover, since the handling of the OAM information can be put together in the device control unit, these methods have an advantage of easily performing the information management.

FIG. 6 is a flowchart illustrating a process flow from frame reception to CCDB construction in MEP.

Upon receipt of a frame, it is determined, with reference to the EtherType field in step S101, whether or not the frame is the OAM frame. If the frame is not the OAM frame, this flowchart related to the OAM frame is terminated because the ordinary frame transfer processing or termination processing is performed. If the frame turned out to be the OAM frame in step S102, the OAM version is checked in the next step S103, and the ME level is checked further in step S104. In step S105, it is determined whether or not the ME level is correct. When a frame of an unexpected ME level has arrived, an alarm is transmitted (step S115) and the process is terminated. If it is the OAM frame of a correct ME level, the OpCode indicative of the OAM type is read in step S106. As a result of the OpCode check, if it is not the CC frame in step S107, the flow moves to step S116 in order to perform the processing for each OAM thereof.

In the case of the CC frame, the MEGID is checked in step S108, and also the MEPID is checked in step S110. If these are not the predetermined MEGID and MEPID, respectively, then in steps S109 and S111 an alarm is transmitted (steps S117, S118), and the processing is terminated. If the MEGID and MEPID are the predetermined ones, the CC frame receiving interval is checked (step S112), and if it is the expected value set as the OAM information, then in step S114 the content of the received frame is recorded in the CCDB or if the entry already exists, the relevant entry information is updated. If the CC frame receiving interval differs from the set value, the flow moves from step S113 to step S119, and the processing will end after outputting an alarm.

FIG. 7 is a functional block diagram showing the configuration of a relay node 2 on the OAM-applicable route. The basic configuration is the same as the configuration of the edge node shown in FIG. 5. Since a relay node does not have the CDDB for learning of the MEPID, a transfer control table 750 is provided in the I/O signal processing unit 510. Moreover, also for an OAM information DB 740, the retained content thereof differs from that of an edge node.

The OAM information DB 740 is described. In the current Recommendation (non-Patent Documents 1, 3), the CCDB retained in an edge node (MEP) includes the MEPID, MEGID, ME level set to a port of the local device, while in a relay node, a port does not have the MEPID. A relay node is specified to check whether or not the ME level of a received OAM frame is correct, but the topology learning function like the one in the MEP is not specified in the relay node. Then, the ME level information for each port is set up in the OAM information DB 740.

The transfer control table 750 is provided for the purpose of the OAM frame identification and the transfer route control in a relay node. Although this table is provided in each I/O signal processing unit 510, it may be retained in the device control unit 500 as in the case of FIG. 5. Here, the description is made using the configuration of FIG. 7.

The received CC frame is transmitted from the switch 513 to the memory 515. Moreover, the switch notifies the processor 514 of this reception. The processor 514 reads the ME level and the MEGID information from the CC frame in the memory 515. If the ME level of the received CC frame matches the ME level set to the receive port, then, together with the receive port ID that is given to the received frame by the input signal controller 512, the receive port ID being included in the internal header, a correspondence between these information is retained in the transfer control table 750.

The transfer control table 750 allows for the route control of an OAM frame having a multicast DA. In a relay node, only the determination of the ME level is specified and a function to learn the MEPID and MEGID from the OAM frame is not prepared. Thus, the route control is not possible with regard to an OAM frame including a multicast DA whose destination cannot be identified from the destination address.

FIG. 8 is a flowchart illustrating a process flow from CC frame reception to transfer-control table 750 construction in a relay node.

The processing from step S101 to step S107 is the same as the one described in FIG. 6. When an OAM frame other than a CC frame is received, in step S116 the transfer route of the OAM frame may be learned using the later-described method.

The MEGID and MEPID of a received CC frame obtained in steps S108, S110 are associated with the receive port information, and then these are stored in the transfer control table in step S201.

FIG. 9 shows the basic configuration of the transfer control table 750 retained in the relay node. This table includes an ME level 901, an MEGID 902, and a receive port ID 903. Each entry of the table is deleted when a certain time has elapsed since the time when the CC frame was received, i.e., the time when an entry was generated. Since the CC frame is periodically transmitted from an edge node, the route information is retained by updating the timer if the entry already exists. This makes the latest OAM route information always available.

FIG. 10 is a view for explaining the route learning effect of the OAM frame, in particular a CC frame, in this embodiment. Consider a state where a CCDB and a transfer control table are established in a node on the route. For the CC frame transmitted from the edge node EN1a, a transmission destination port is selected based on the ME level and MEGID thereof and then this CC frame is transferred to the relay node MN2b, in the relay node MN2a. In the relay node MN2b, the CC frame is transferred to the edge node EN1b similarly with reference to the ME level and MEGID. With the transfer control table 750, the flooding to the relay node MN3e can be prevented, and the processing of OAM and the utilization of resources in the whole management domain can be improved.

FIG. 11 illustrates, as a typical form of the ME topology in the point-to-point configuration shown in FIG. 1, an ME configuration when a plurality of MEs of different routes are included in the same MEGID.

At this time, two kinds of methods of configuring MEs can be conceived as follows. The first one is a method of configuring MEs so that the level of the ME differs between MEG1 and MEG2, respectively, and the second one is a method in which the MEs of the same level and of different routes are configured in the same management domain. Since the first method can identify ME, i.e., MEG, by the multicast DA of the OAM frame, a plurality of point-to-point MEGs will exist independently. Thus, the route control in the unit of MEG can be achieved by applying the OAM control method described in FIG. 1 to the both MEGIDs as it is. In the second method, since the ME level is the same, an MEG that bundles a plurality of MEs is denoted by a single ID. For this reason, the route configuration on the MEGID level, or on the ME level indicated by the multicast DA would be a two-dimensional network structure in which an edge node group (MEP group) comprising a plurality of devices is connected to another edge node group via a plurality of intertwined routes.

At this time, as described in FIG. 1, by referring to the MEPID and CCDB included in the CC frame, a route to which the CC frame should be transmitted can be selected among a plurality of transmission ports including the same MEGID. On the other hand, for example, with regard to the OAM frame, such as a LB (Loop Back) frame, that does not include the MEPID, it is not possible to determine which port the CC frame is transmitted to. In this case, in principle, it is impossible to specify a route heading for the individual MEP. However, preparation of the OAM transfer control table, in which the multicast DA (ME level), the MEGID, and the receive port are associated with each another, allows an OAM frame to be transmitted only to the management path, on which the relevant MEGID is configured, using the OAM control method described in FIG. 1. This prevents the unmanaged device and ports from processing the OAM frame, and thus allows the load on the resources in the management domain to be reduced and in turn allows the influence on the user traffic to be suppressed.

In the edge nodes EN1a-1c, ME1 and ME2 can be distinguished using MEPID. The CC frame is transmitted from EN1a to the counterpart edge nodes 1b, 1c, while the CC frame is transmitted from EN1b to EN1a and from EN1c to EN1a, respectively. Since MEPID cannot be identified in the relay node, the routes to MN2b and MN2c cannot be distinguished in MN2a if the MEGIDs are the same. For this reason, two CC frames are flooded to each direction, respectively. However, for example, if MN2a is connected to the node 3e other than MN2b, MN2c, the frame transfer to the node 3e can be prevented using the method described above.

In MN2c, since the CC frame from EN1b has not been received, the transfer destination of the CC frame from MN2a can be narrowed down to EN1c referring to the transfer control table. The operation in MN2c is the same as the one in the case of FIG. 10.

As described above, for a frame that includes MEGID in the frame, the transfer route thereof can be narrowed down only to the OAM-applicable route by means of the relay nodes. In the case of FIG. 11, the number of frames on the OAM-applicable route will increase. However, if the present invention is not applied in using the multicast DA, the number of frames flooded to the OAM-inapplicable nodes will increase multiplied by the number of branching MEs in each node. Accordingly, the present invention may be more advantageous in the multicast configuration as shown in FIG. 11.

So far, a route control method for the CC frame has been described. Here, with regard to OAM frames other than the CC frame, a route control method thereof is proposed.

In the case where a transmission destination is identified using the MAC address, in the destination address of the OAM frame a use of the multicast DA indicative of the ME level is not assumed. Then, in order to unify the methods into a method of using the multicast DA indicative of the ME level in the OAM frame, another information representing the destination needs to be included in the frame. Otherwise, the route cannot be narrowed down in the relay node. As another application of the multicast DA, for example, a group of destination nodes may be specified by the multicast address in transmitting the LB frame to a plurality of destinations. In the relay node, other than the ME level cannot be used as the information of the ME, and then, a frame will be naturally flooded to all the routes.

In order to prevent this, also with regard to the OAM frame whose transmission destination is supposed to be indicated by the destination MAC address, the transfer route thereof can be specified by including into this frame the MEGID as the ME identification parameter of the relay node. Assume that the ME is used in a point-to-point configuration. Thus, also the above-described multicast LB may be achieved using a topology for bundling a plurality of MEs. Accordingly, in an edge node transmitting the OAM frame, the MEGID corresponding to a multicast MAC address as the destination MAC address or a group of the destination MAC addresses is obtained and is inserted into the frame.

FIG. 12 shows a configuration example of a correspondence table 1200 of a destination MAC address 1201 and an MEGID 1202, the correspondence table 1200 being retained in an edge node for this purpose. This table may be prepared as an expansion of the CCDB or may be prepared independently of the CCDB. Note that, in the CCDB, since the destination MAC address is not specified to be retained in the entry, this new table needs to be introduced. The route learning operation in a relay node is the same as that of FIG. 8. Moreover, when this method is used, the MEP and MAC address of the destination node need to be set up with reference to the network configuration in advance during the ME setup. This can be achieved easily because the configuration of the network is known in advance assuming the ordinary setup by an operator.

So far, a route control method in the case where a relay node also supports the OAM function as an edge node does has been described. However, not all the nodes are provided with the OAM function during the transitional period of the network facilities, and thus a network may be configured using the existing switches. Hereinafter, the OAM frame route control when the switches not supporting the OAM co-exist is described.

Note that, as described in FIG. 11, a case where a plurality of MEs of different routes are included in the same MEGID can be treated as in the case of the ordinary point-to-point ME. Accordingly, this case will not be referred to hereinafter and the point-to-point case will be described as an example.

FIG. 13 shows a network configuration in the case where an existing node (node not supporting the OAM function) is used in the relay node and a node that supports OAM is used in the edge node. The concept of the route control is the same as that in the case of FIG. 1 except that relay nodes 5a, 5b do not support OAM. In this embodiment, in establishing transfer route control tables 50a, 50b in the relay nodes, respectively, an IGMP/MLD snooping function provided in the conventional node is used. That is, in the edge node, a route setup frame is transmitted using a report frame format of the IGMP/MLD, and a relay node having received this will learn of the receive port of this frame using the snooping function. By transmitting the OAM route setup frame of the IGMP/MMLD frame format from the both ends of the ME using this function, the OAM frame transfer route can be narrowed down. The transfer control tables 50a, 50b are a frame transmission route control table of each port, the frame transmission route control table being configured by snooping.

FIG. 14 shows a route setup sequence in the embodiment of FIG. 13. In processes 1401, 1402, ME is configured in the edge node, i.e., a node that supports the OAM. In the edge node, a route setup frame generated in process 1403 is transmitted to a route which the ME belongs to (process 1404), and a node having received this frame learns of a correspondence between the multicast address and the receive port by snooping process (process 1405). For this control information, the expiration date and time of the entry is controlled by a timer. Hereinafter, in the same manner, in processes 1406, 1407, a relay node MN5a obtains route information and forwards a route setup frame to the edge node 1a, i.e., the termination point of the ME (process 1408). In the edge node 1a, the setup frame is terminated, and the transfer control table by snooping is established in the local device, and the processing is terminated (process 1409).

By performing the above processings also to the backward direction, an OAM frame transfer route 1410 along the ME can be set up.

Note that, in order to establish the CCDB in the edge node that supports the OAM, the CC frame should be transmitted. In this system, after an OAM route could be established by transmitting the route setup frame from the edge node, the flooding of the CC frame can be prevented by transmitting the CC frame with a multicast DA that is already learned in each node.

FIG. 15 is a sequence showing an example of a method of deleting the route information in deleting ME. After deleting ME in processes 1501 and 1502, a route setup frame is transmitted from the edge node. For the frame in this case, a group leave notification of IGMP/MLD is used. For example, in the format of IGMPv2, a leave message is used (process 1503). In this message transmission 1504 and a learning processing 1505 associated therewith, the relevant entry is deleted from a snooping table. By repeating this until it reaches the edge node 1a, the route information is cleared (processes 1506 to 1509).

FIG. 16 is an example of a network configuration in the case where a plurality of ME are set up in a management domain, although the OAM support situation of the nodes on a single ME is the same as that of FIG. 13. Here, when MEs are configured so as to belong to different MEGIDs, respectively or so that a plurality of MEs may not exist in one node as in FIG. 16, the respective MEs need to be distinguished, independently.

In order to independently perform the route control for each multicast DA in such situation, it is necessary to perform snooping process for each VLAN in the management domain. In the snooping process, upon receipt of the IGMP/MLD report message, the multicast MAC address is learned from the multicast group address included in the message, and an entry for transferring a traffic addressed to a multicast group only to a port having received the IGMP/MLD report message is prepared.

Specifically, a single VLAN domain is configured in order to transfer the user data in the management domain, and a separate VLAN domain is configured for each MEGID in order to identify the individual MEGID and in order to identify the OAM frame and the user data. Accordingly, a VLAN for user data transfer and a VLAN for MEGID are configured mutually-independently in the management domain, and both VLAN for user data and VLAN for OAM are configured so as to be accommodated in the nodes along the ME.

In the case of this configuration, in the sequences of FIG. 14 and FIG. 15, a VLAN tag corresponding to the MEGID is added and transmitted in transmitting the IGMP/MLD frame from an edge node. Accordingly, in the relay node, the snooping process is performed for each VLAN, and the ports are distinguished in the unit of VLAN to establish a route control table for each individual logical port.

FIG. 17 shows an example of the IGMP/MLD frame transmitted from the edge nodes EN1a, 1b. Here, an example of a frame structure complying with the format of IGMPv2 is shown. However, the present invention can be applied also to other protocols.

An Ethernet header, an IP header, and an IGMP header are included in the frame. A destination address 1701 is generated by combining the lower 23 bits of a multicast group address 1708 and 25 bits of information including a fixed pattern indicative of the multicast. A sender address 1702 is the address set to a port of the sender edge node. XXXX indicative of the IGMP message enters into an EtherType field 1703. VLAN tags 1704, 1705 are inserted as required. As shown in FIG. 16, when a plurality of MEGIDs are configured in a management domain, the VLAN tag is required in order to identify the OAM route using VALID. A destination IP address 1708, and an IP address 1707 assigned to the sender device are included in the IP header. The destination IP address is fixedly assigned depending on the type of the IGMP message, and 244.0.0.1 is inserted in the case of a group participation request, and 224.0.0.2 is inserted in the case of a group leave request.

An IGMP message 1710 is included in the IP packet. IGMP Type information 1711, a maximum response time 1712, and a multicast group address 1715 (and Reserved 1713, Checksum 1714, as required) are included in the IGMP message 1710. The IGMP Type field 1711 indicates the type of the IGMP message. The IGMP TYPE field 1711 is set to 0x11 in the case of a participation request message, and 0x17 in the case of a group leaving message. The one to be snooped is a multicast group address 1715. Here, the address 1708 to be snooped is an IP multicast address including a part (lower 23 bits) of the multicast address given to the OAM frame. With regard to the sender IP address, the IP address of a transmission port is inserted in the case where the edge device retains IP information in each port. However, since this sender IP address field is not required to control the OAM frame, a dummy address may be inserted without having an influence on the frame control.

FIG. 18 is a flowchart showing a process flow for generating the OAM route setup frame in an edge node, in the OAM topology of FIG. 13 or FIG. 16. In S301, the MEGID setup number in the network to which OAM is applied is checked. Note that, even when MEGID is single, the user data and the OAM frame may be distinguished using VLAN. When VLAN is used, in step S302 the corresponding VID is obtained with reference to a correspondence table (hereinafter, referred to as an OAM topology management table) of MEGID and VID, the correspondence table being retained in the edge node. A tag including the obtained VLAN ID is inserted, and as shown in step S303 of FIG. 17, the IGMP frame or the MLD frame is generated and is transmitted toward the OAM-applicable route.

FIG. 19 is a configuration example of the OAM frame transfer control table retained in the relay node. Since the snooping function is used, the basic configuration is the same as that of the conventional switch. A combination of a multicast group address and a receive port is learned for each VLAN. Specifically, upon receipt of the IGMP/MLD report message, the multicast MAC address is learned from the multicast group address included in the message, and then an entry for transferring the traffic addressed to a multicast group only to a port having received the IGMP/MLD report message is prepared. With regard to the address to learn, since it is an object to provide the OAM function of the data link layer, here, a table is configured by associating the multicast MAC address with the receive port. In a typical switch, both the IP multicast address and the MAC multicast address are often learned, and are associated with the receive port ID and these are managed. The IP multicast address may be included in the management table or the multicast flow may be independently managed by a firmware, however, here, in order to achieve the route control of the layer 2 OAM frame, such as the Ethernet OAM, a method of learning MAC addresses is illustrated.

The table includes a multicast MAC address 1201, a VLAN ID 1202, and a receive port 1203. The multicast address indicates the ME level, and the VLAN ID indicates MEGID, and this table corresponds to the transfer control table of FIG. 9.

FIG. 20 shows a table 2000 for specifying the transfer route with respect to the frame that does not include MEGID in the OAM frame, as described in FIG. 12. When MEGID is not included, with the methods of FIG. 13 to FIG. 19, an ME which the received OAM frame is intended for cannot be identified in the relay node. Accordingly, filtering cannot be carried out on other than the ME level (i.e., multicast address).

Then, in the edge node, the VLAN tag for route control is added in transmitting the OAM frame. The ID of MEP/MIP set to a port on the OAM-applicable route or an MAC address 2001 is set to the edge node. Then, the corresponding VLAN ID 2002 is set to these targeted ME information (MEP/MIPID, ME level, MEGID), and these are described on this table in advance. In transmitting the OAM frame, the corresponding MEGID and MEP/MIPID are obtained based on the MAC address and the ME level from the CCDB, with regard to the ME which the OAM is intended for. Furthermore, the VLAN ID corresponding to the MEGID is obtained. By generating the OAM frame, in which this VLAN ID is inserted into a tag, the OAM frame that does not include MEGID information also can be controlled in the same way as the CC frame. The table of FIG. 20 directly associates the corresponding parameters in the course of obtaining the VLAN via the MEGID. The table of FIG. 12 may be expanded or this table may be implemented as it is.

FIG. 21 shows an OAM topology in the case where a plurality of MEs (MEG1: 2120, MEG2: 2110) are configured and also all the MEs included in the MEG configure an OAM area that is closed within the management network. That is, the MEGID for identifying the area is set in the management domain. This is used when you want to individually perform the performance measurement and other operational administration to a part of the network by reflecting the device replacement, differences in the device vendors, or the like.

In this case, since the MEP is configured at the boundary between the management domains that are usually distinguished by the MEGIDs, a frame will never be transferred to the area of the other MEGID as long as the MEP is configured correctly. However, when the OAM frame from the other MEGID area has mixed in for reasons of erroneous connection or the like, the transfer thereof needs to be prevented. With regard to this case, the functions required for the device are the same as those of the point-to-point case described in FIG. 1 to FIG. 20. However, in this case, other than the method of identifying the correct destination of the MEGID, a method of setting up valid MEGIDs in advance so as not to transfer the frame of an unauthorized MEGID is also possible.

As described above, although a method of controlling MEGID information by converting this into VLAN ID has been described, these VLAN ID information are replaced with MPLS label information and thereby the OAM-applicable path can be identified based on the label information, and also for the OAM function in an MPLS network, the route control can be achieved similarly.

Hereinafter, effects of the present invention are specifically described. In order to compare with the above-described operation assumed in the present invention, here, there is shown a packet processing procedure within the network in the case where the Ethernet OAM control method of the present invention is not used.

FIG. 22 shows a configuration example in the case where the network of FIG. 1 is configured only with the devices that do not correspond to the Ethernet OAM. This is similar to the configuration in the case where the relay nodes 2a, 2b do not have the transfer control table in FIG. 13. At this time, each node of FIG. 22 is provided with an ARP table and an IP routing table that have been conventionally used to transfer an L2 frame or an L3 packet. Now, assume that the network management domain comprises one VLAN.

Assume that an OAM frame is inserted from the device 1b, and a path on which the user data runs is a route from the device 1b to the device 3a through devices 2b, 2a. Usually, the devices are connected to each other (e.g., with Ethernet), and a routing protocol (e.g., OSPF or RIP) is set up so as to operate between the connected device interfaces, and thereby the ARP table and the IP routing table are configured in a memory within the device. Accordingly, with the destination MAC address or the destination IP address, which is the header information of a packet which each device receives, an interface to which each packet is transferred can be identified in the device, and the user data will reach the target place.

On the other hand, in order to transfer the OAM frame, the destination of the OAM frame should be known on the MAC layer. Since the Ethernet OAM is processed on L2, the IP protocol, i.e., a higher-level protocol, does not involve in transferring the OAM frame at all. For this reason, the ARP table and IP routing table, which the device conventionally has, cannot be used in the OAM frame transfer control.

In FIG. 22, the nodes other than the node 1b for transmitting a frame and the node 1a which is the destination of the frame do not have a means for distinguishing the OAM frame from the user data frame. Then, in other than the nodes 1b, 1c, the OAM frame is regarded as simply a broadcast frame and is subjected to the transfer processing.

The multicast frame is broadcasted within the same VLAN domain. Accordingly, in the network of FIG. 22, the OAM frame that is received in an interface A of the node 2b is copied and transferred to interfaces B, C. Similarly, in the node 2a, the OAM frame received in an interface D is deployed to interfaces E, F at the same time. In this way, the OAM frame using a multicast address is deployed to all the directions on the route, and is expanded to the whole network via other nodes. In the view, only a flow heading for EN1a is described, however, in a steady state in a certain time after the transmission of the OAM frame from EN1b, the OAM frame will be broadcasted from all the interfaces to MN2a, MN2b, and MN3e which are the relay nodes. In such a state, the monitoring of a specific route is impossible.

The above-described state not only wastes the network resource, but also requires a special processing in the device that understands the Ethernet OAM, in order to achieve the frame processing for checking the state of the route as in the OAM frame (CC frame, in particular). For example, such a method can be conceived for employing only a state notification by a reply obtained within an assumed time and discarding the other ones as wrong route information due to a packet having passed through an undesired route. However, in order to perform such processing, it is necessary to know all the traffic patterns that usually vary depending on the system configuration, and thus the condition setup for correct operation is usually difficult. Accordingly, only with the conventional table, the OAM frame cannot be utilized effectively.

From the above, in order to achieve the maintenance/management of communication on L2 level in a packet transmission network, such as Ethernet or MPLS, the transfer control table of the present invention is required in a relay node that supports OAM or in a relay node not supporting the OAM.

FIG. 23 shows a case including an optical access system (PON; Passive Optical Network) as a configuration example of a network to which the Ethernet OAM function is applied.

Due to the enhanced network services and an increase in the number of contents and the size thereof, the traffic volume involved in the network utilization by end users has been expanding. For this reason, the majority of subscriber lines also are now based on the optical communication, and the investigations are being made to achieve higher speed. For the user traffic, most of them are achieved using Ethernet. The Ethernet is inexpensive and also easily handled, but a change in the network topology frequently occurs and the Ethernet is a CSMA/CD based communication and employs a best effort scheme, in which an unexpected delay or a packet loss may occur during the packet transmission. Accordingly, it is difficult to secure the communication quality. Especially in recent years, an integration of broadcasting and communication has been argued. Moreover, at present when networks as the social infrastructure for supporting the public administration and personal life have been widespread, it is becoming essential to secure the communication in packet networks such as Ethernet.

FIG. 23 shows a configuration, in which each home or each company is connected to a network via a carrier network including PON. Here, the carrier network refers to a packet transmission relay network using a wide-area-Ethernet network or MPLS. Conventionally, the relay network has been configured using leased lines, however, in recent years, a shift from the leased-line communication to the packet transmission is under way to peruse more flexible system construction and the cost reduction by effectively utilizing the network resource, and the like. The PON system is a large capacity information distribution system using optical signals. While the PON system is a system for mainly performing the processing on less than L2, the implementation of the Ethernet OAM is required in order to accommodate a plurality of services, such as Ethernet or telephone lines.

FIG. 23 shows an example, in which PON is connected to both ends. The PON accommodates the user lines from each home, and the access lines from a company site to a relay network. Moreover, the PON can be used also as a relay optical line for connecting between bases, such as base stations of a wireless carrier. Here, a form where EN1 is accommodated in OLT (Optical Line Terminal) 2301 is described. However, here, only elements are described and thus the actual device may be of an integral type or of a separate type. Note that, reference numeral 2302 represents an Optical Network Unit (ONU).

Here, an ME setup example in a two-level hierarchy is shown. On the higher level, ME 2340 for monitoring the end-to-end service range is configured, while as the ME for maintaining the route condition for each segment in the lower level, a user segment ME 2330, a PON segment ME 2320, and an Ethernet segment ME 2310 are configured. Of course, a finer level hierarchy can be achieved. The OAM function in the PON range can be separately applied to the PON segment. However, in order to perform the end-to-end maintenance, a method of applying the Ethernet OAM to the maintenance of the PON range as shown in the view can be conceived.

The above description has been made with regard to the embodiments, but the present invention is not limited thereto, and it is apparent to those skilled in the art that various kinds of changes and modifications can be made within the spirit of the present invention and the scope of the attached claims.

BRIEF DESCRIPTION OF THE DRAWINGS

FIG. 12 shows a configuration example of a correspondence table between a destination MAC address 1201 and MEGID 1202, the correspondence table being retained in an edge node, in performing the route control of an OAM frame that does not include MEGID.

INDUSTRIAL APPLICABILITY

Figure 1:
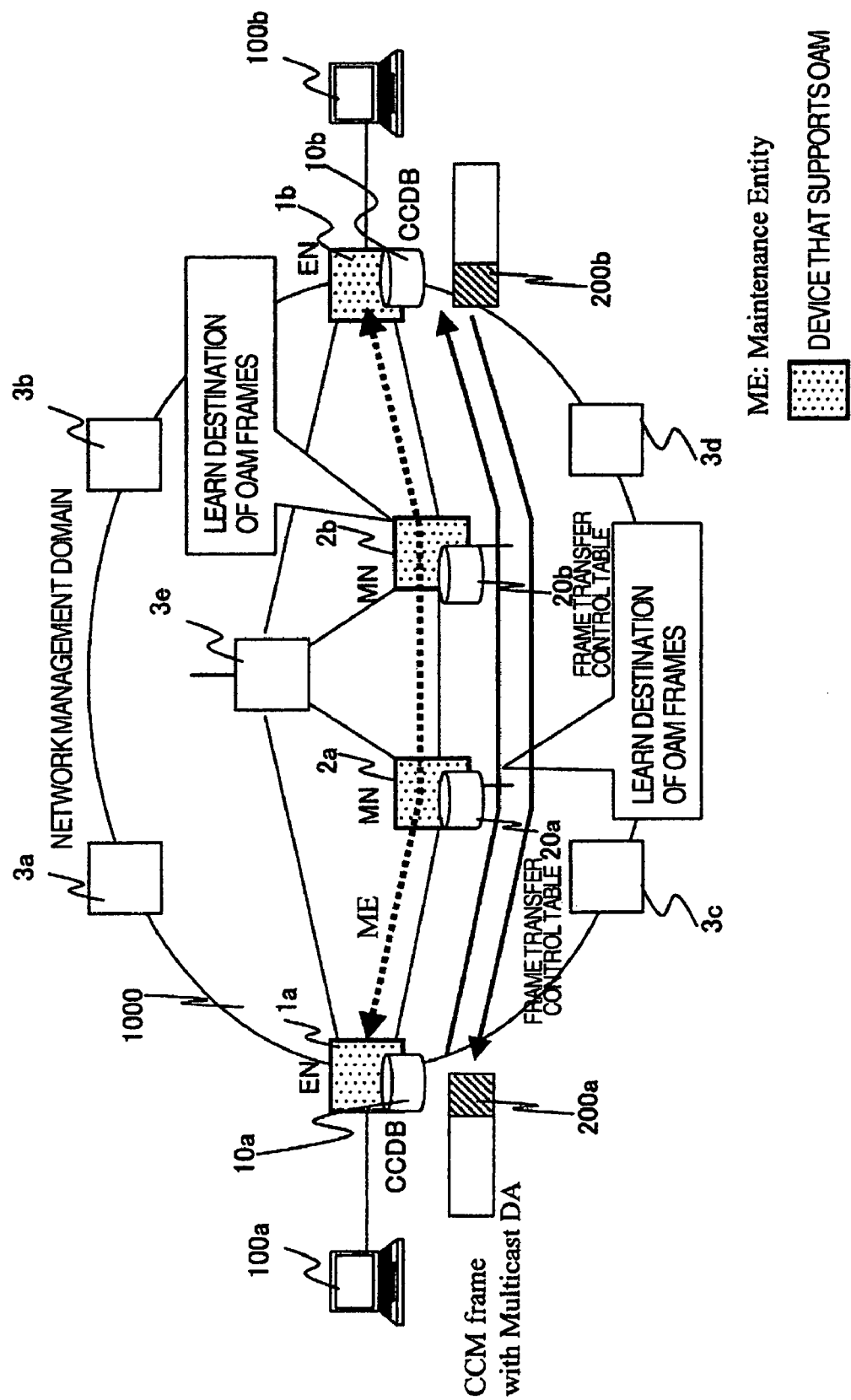
FIG. 1 shows a configuration example of an ME in a network management domain.
Figure 2:
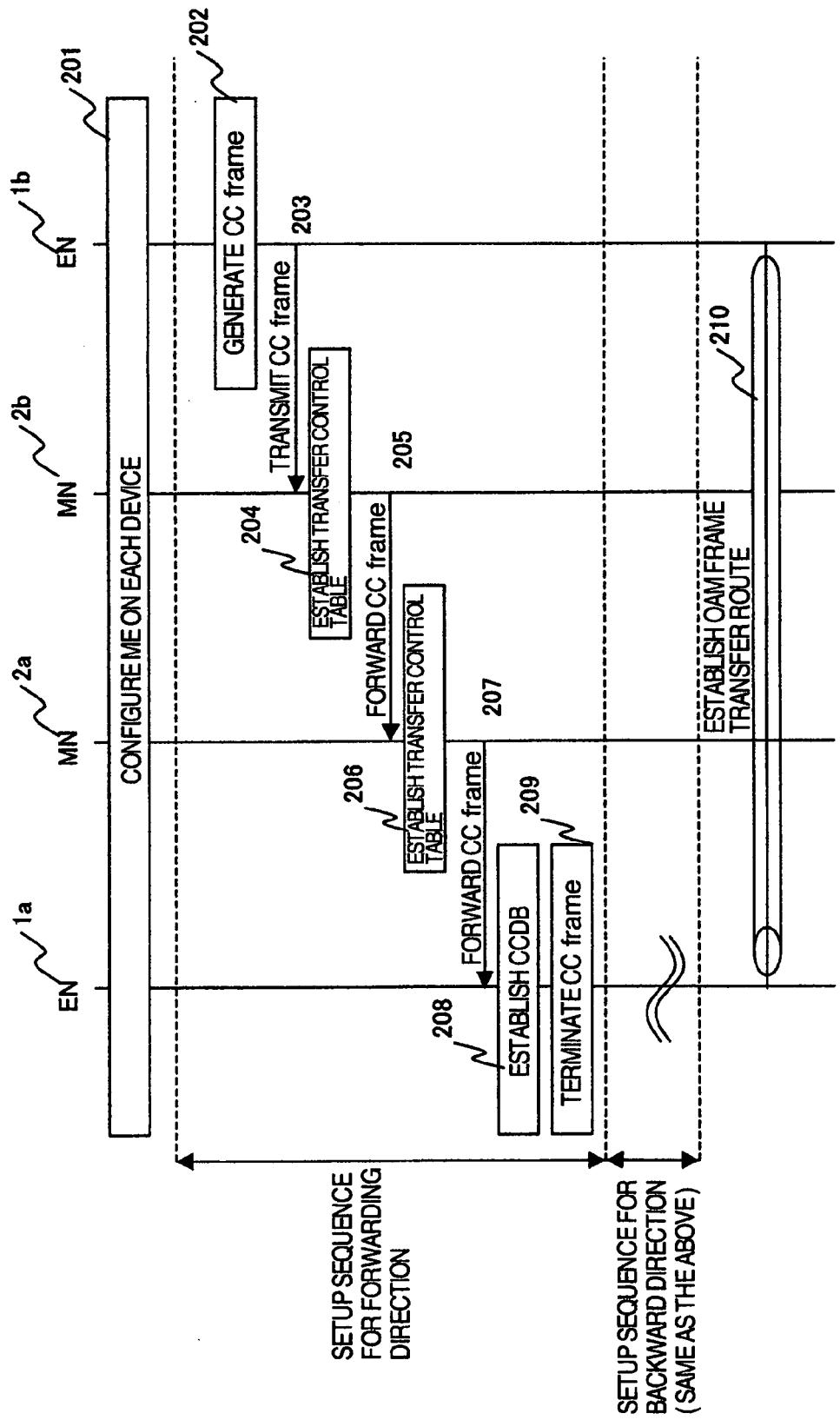
FIG. 2 is a sequence showing a procedure to generate an OAM transfer control table in the network configuration of FIG. 1.
Figure 3:
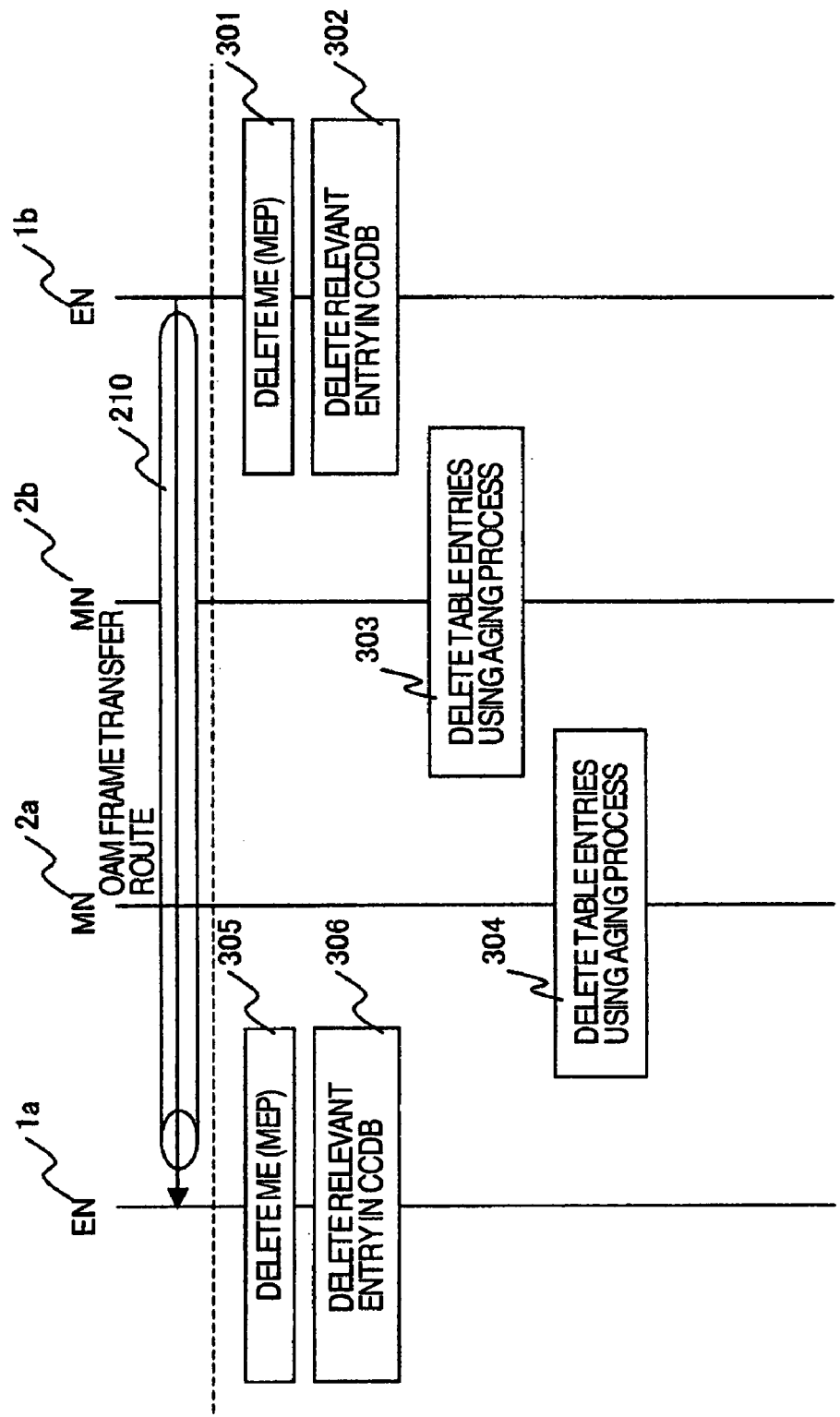
FIG. 3 shows a sequence in deleting an unwanted entry from the OAM frame transfer control table set up in the sequence of FIG. 2.
Figure 4:
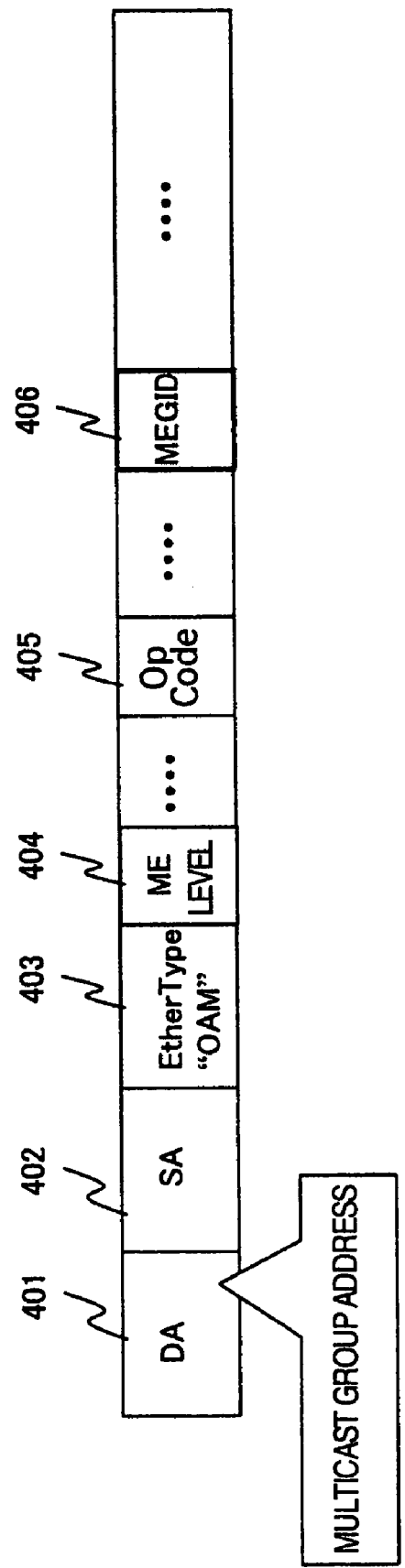
FIG. 4 shows an OAM frame format including a multicast DA.
Figure 5:
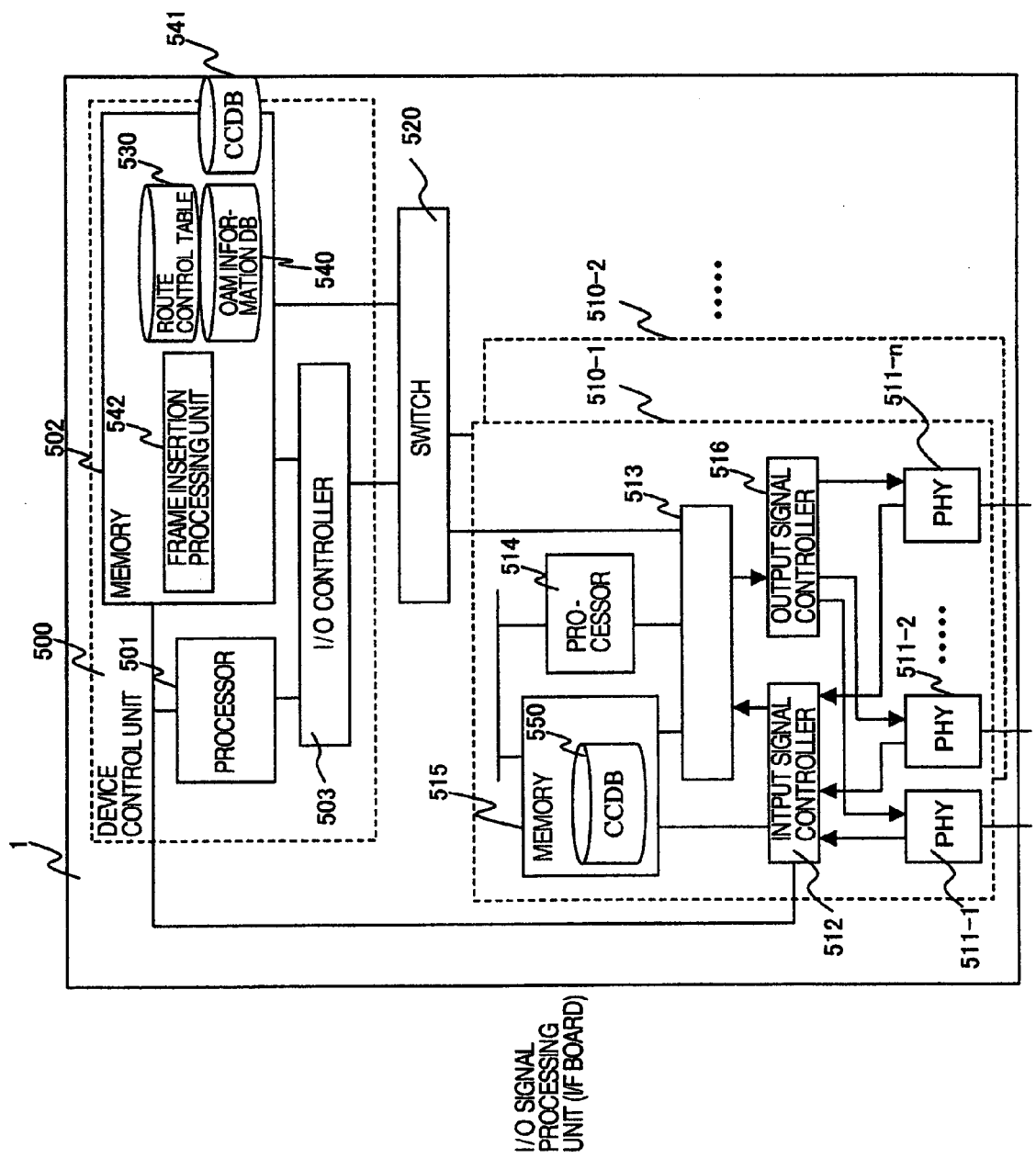
FIG. 5 is a functional block diagram showing the configuration of a frame transmission device that supports Ethernet OAM.
Figure 6:
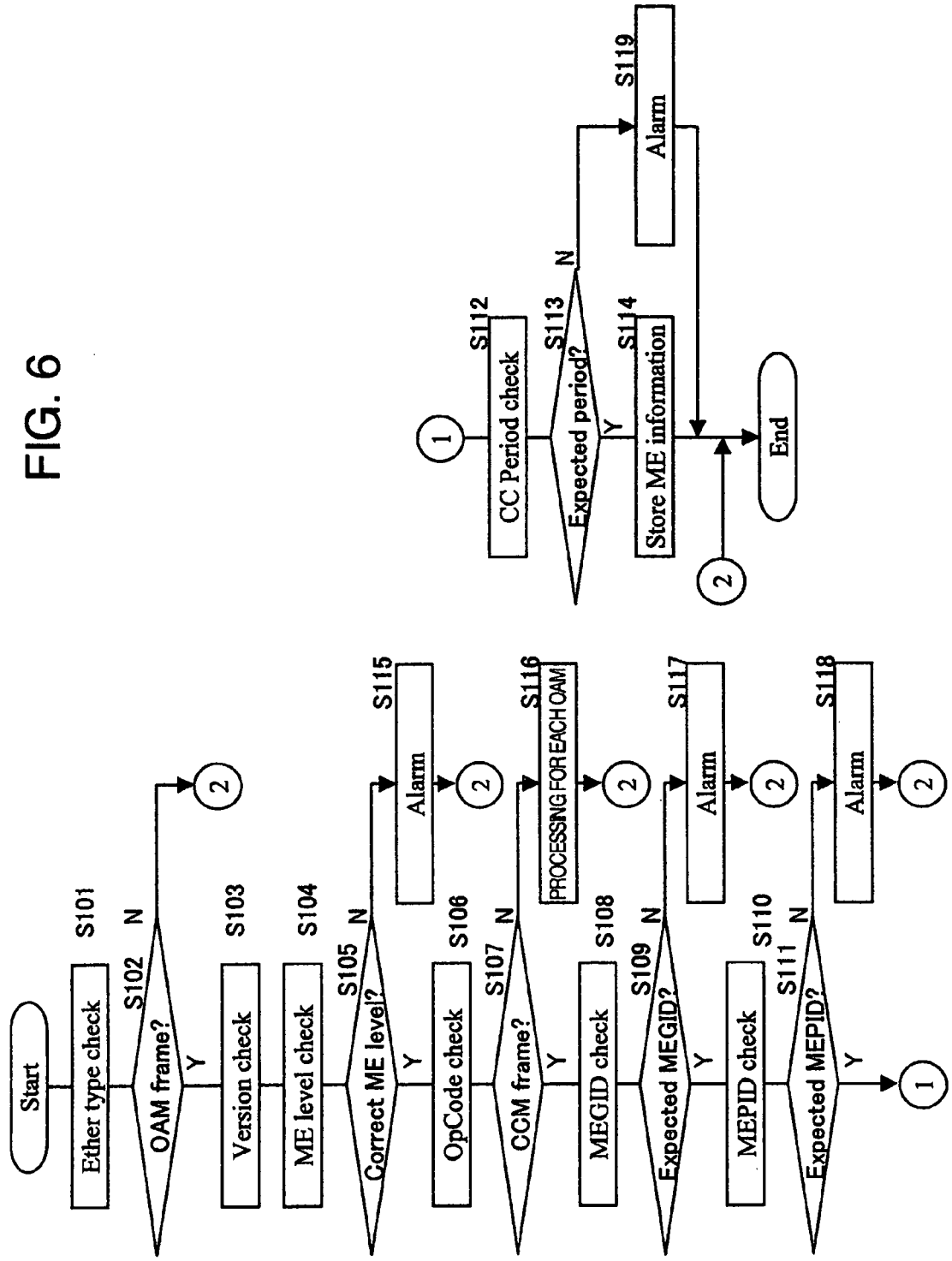
FIG. 6 is a flowchart illustrating a process flow from frame reception to CCDB construction in MEP.
Figure 7:
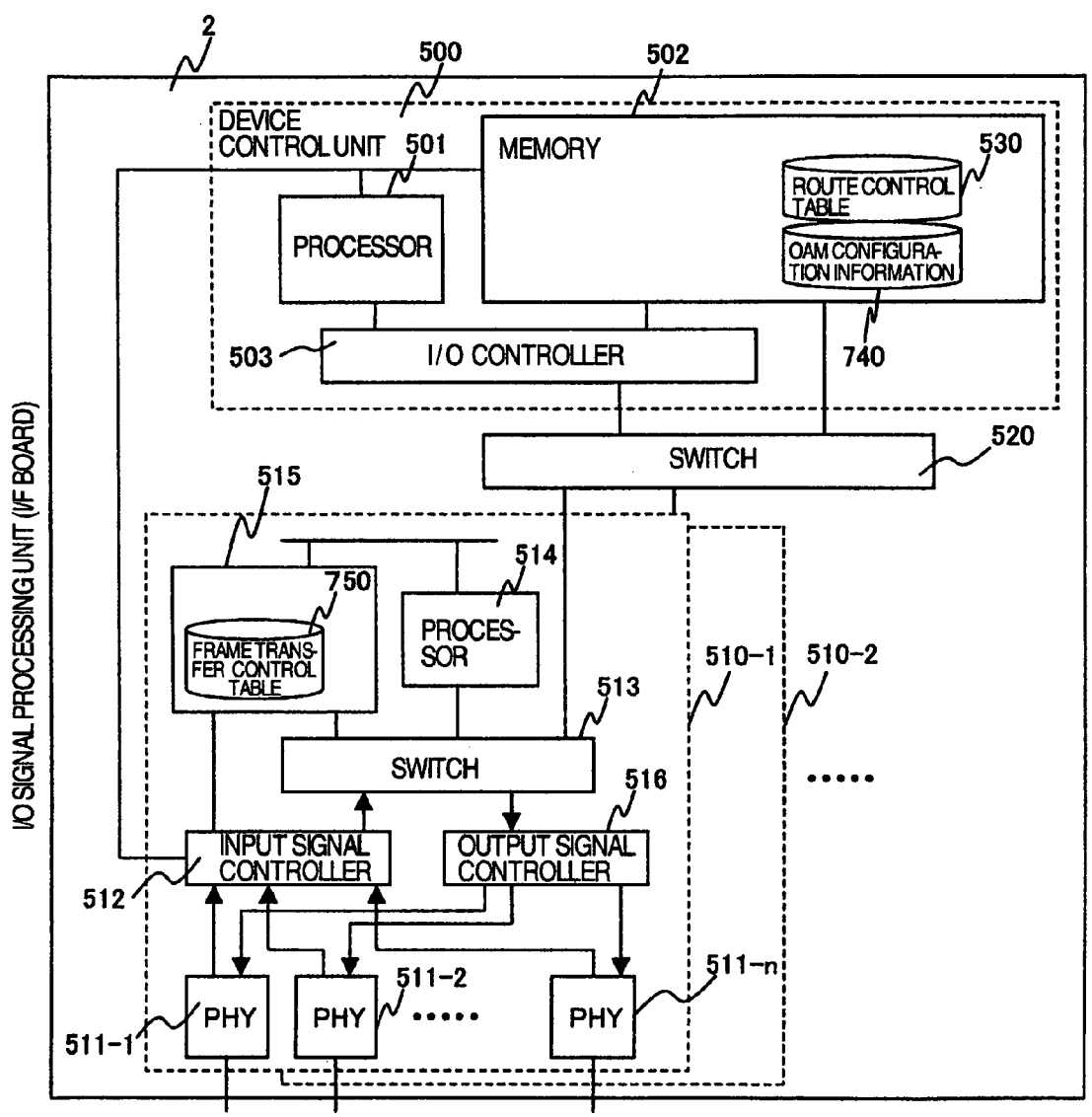
FIG. 7 is a functional block diagram showing the configuration of a relay node 2 on an OAM-applicable route.
Figure 8:
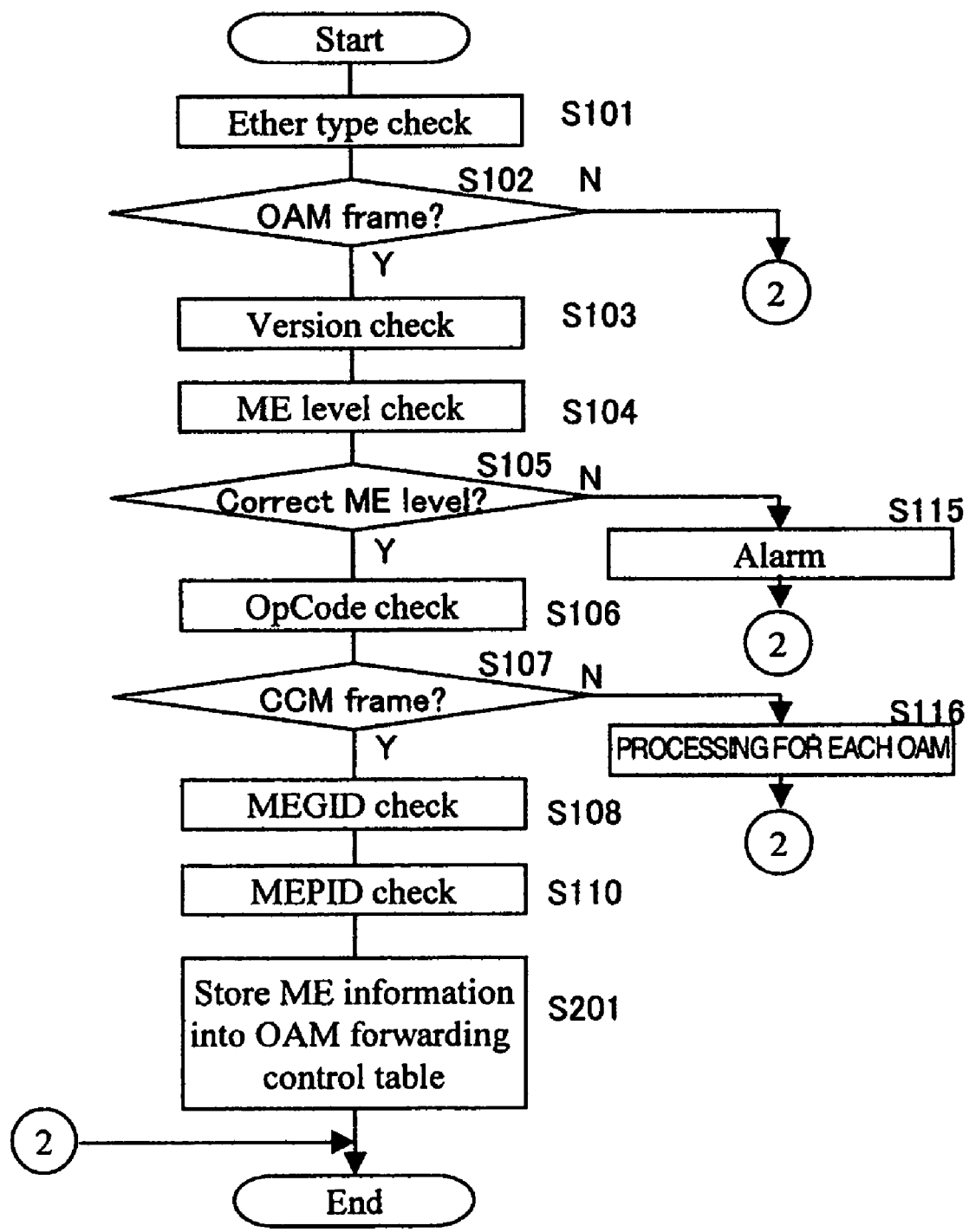
FIG. 8 is a flowchart illustrating a process flow from CC frame reception to transfer control table 750 construction in a relay node.
Figure 9:
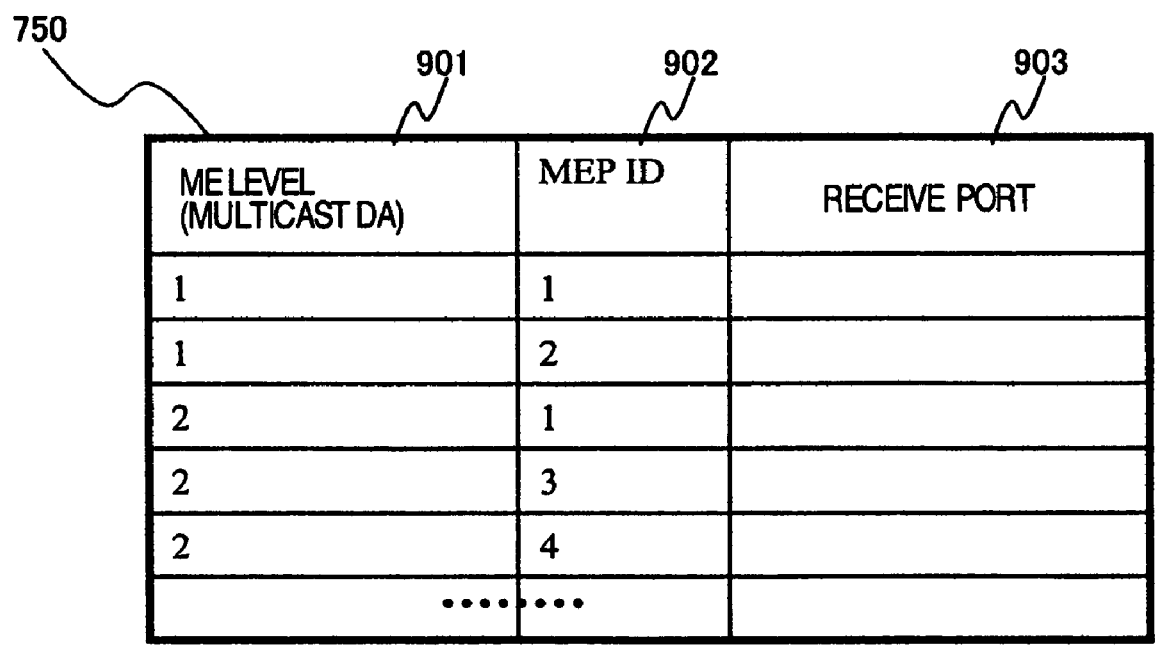
FIG. 9 shows the basic configuration of the transfer control table 750 retained in a relay node.
Figure 10:
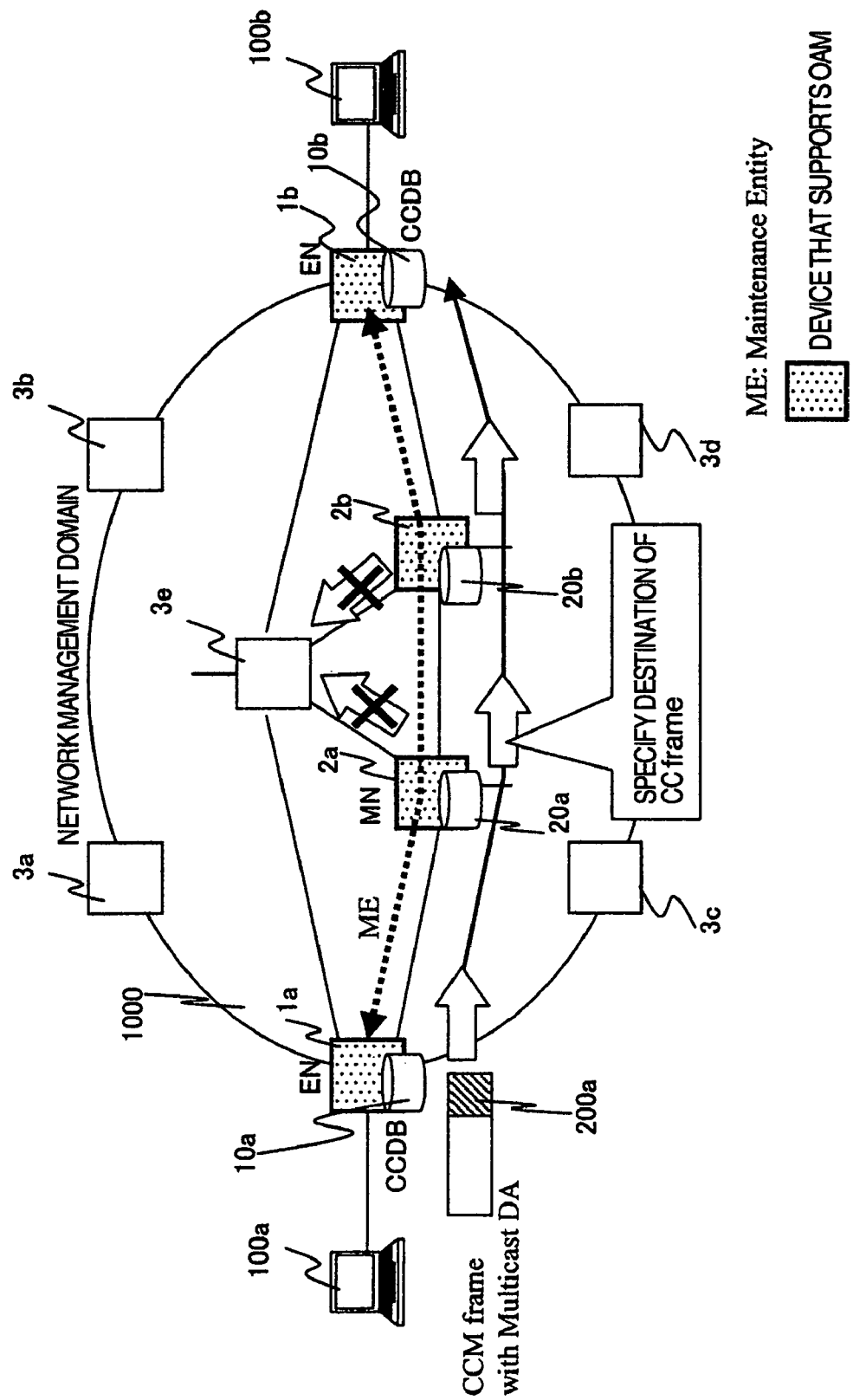
FIG. 10 is a view for explaining the route learning effect of an OAM frame, in particular a CC frame, in the present embodiment.
Figure 11:
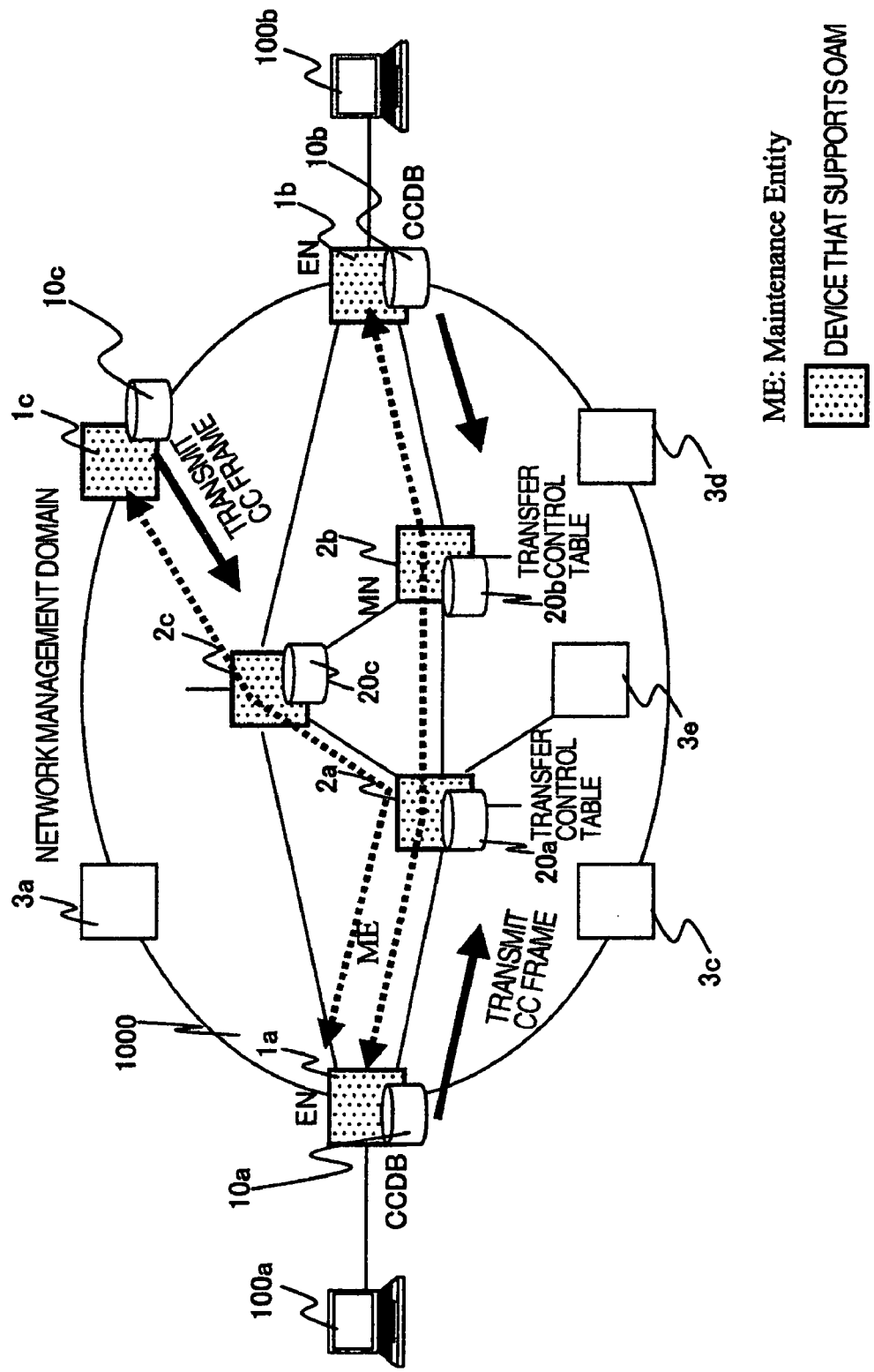
FIG. 11 shows, as a typical form of an ME topology in point-to-point configuration shown in FIG. 1, an ME configuration when a plurality of MEs of different routes are included in the same MEGID.
Figure 13:
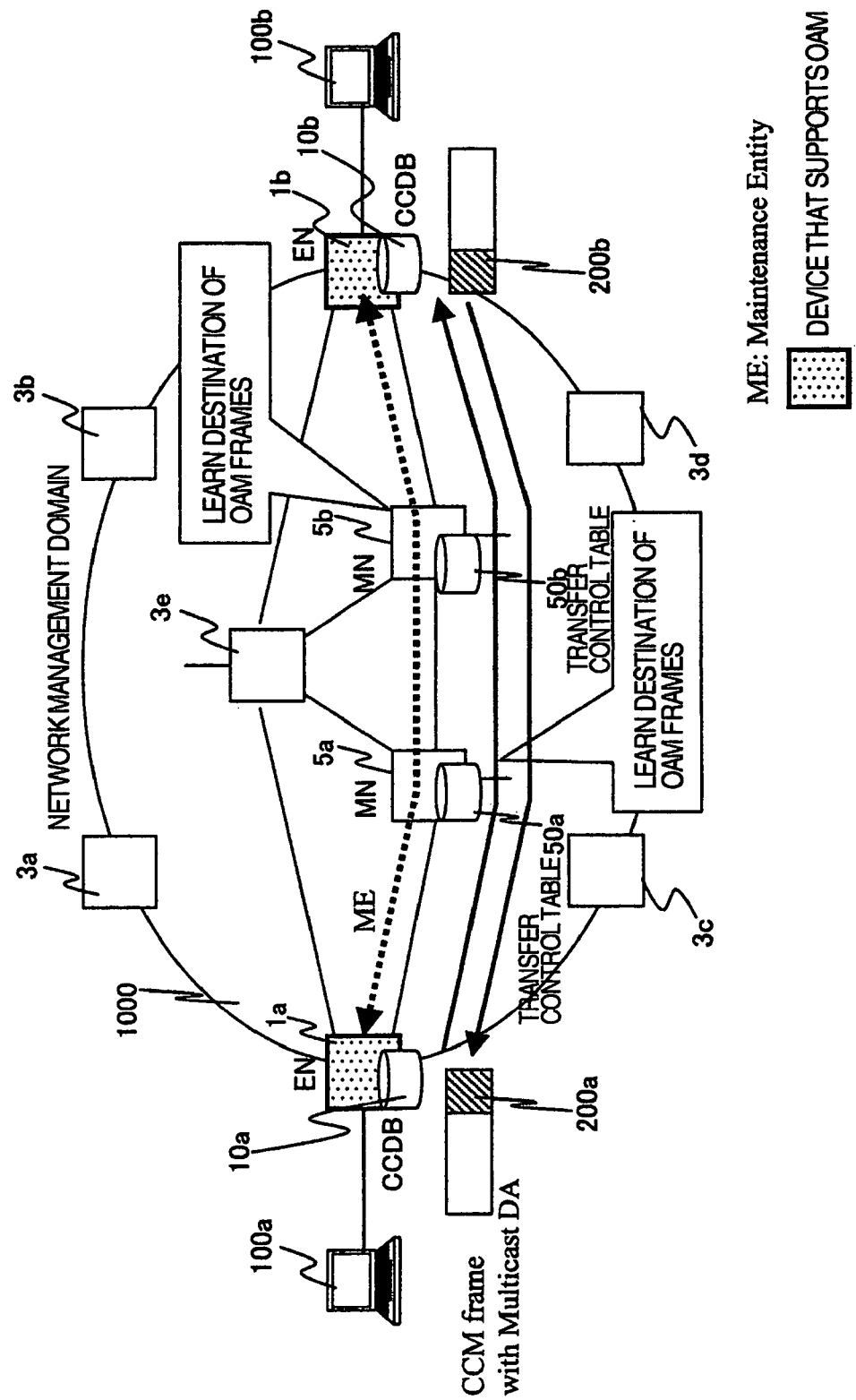
FIG. 13 shows a network configuration in the case where an existing node (node not supporting the OAM function) is used in a relay node and a node that supports OAM is used in an edge node.
Figure 14:
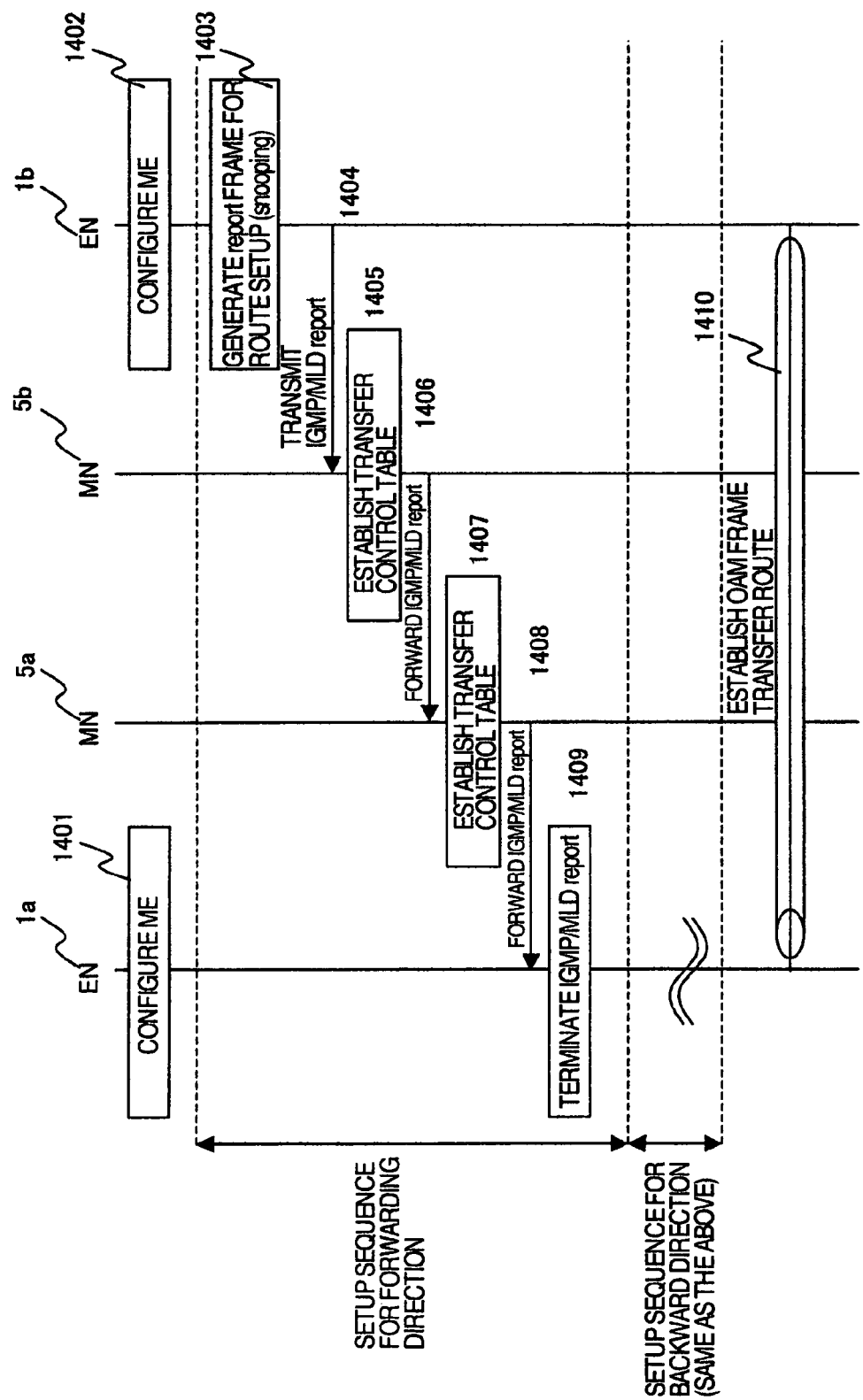
FIG. 14 shows a route setup sequence in the embodiment of FIG. 13.
Figure 15:
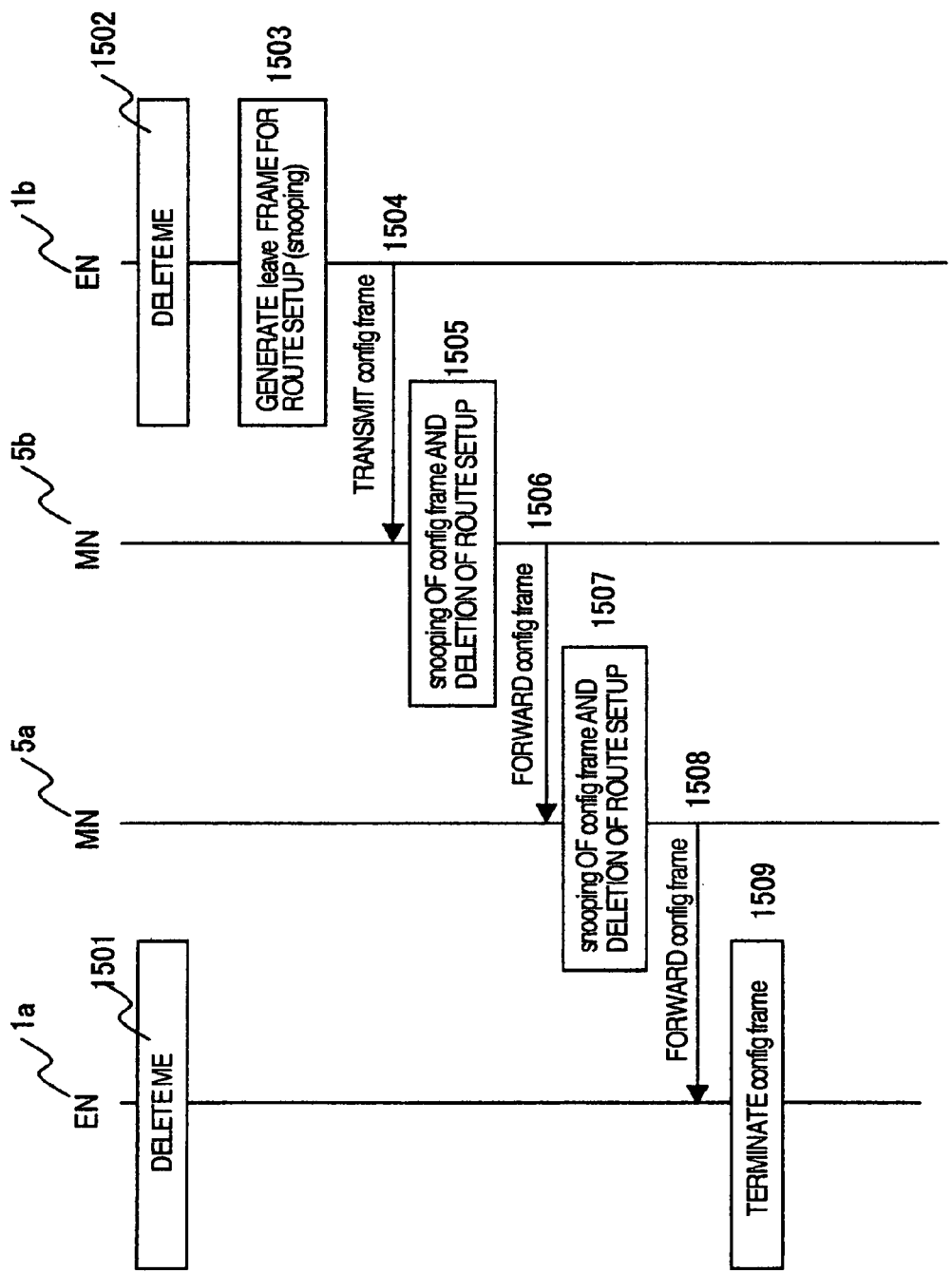
FIG. 15 is a sequence showing an example of a method of deleting route information when deleting ME.
Figure 16:
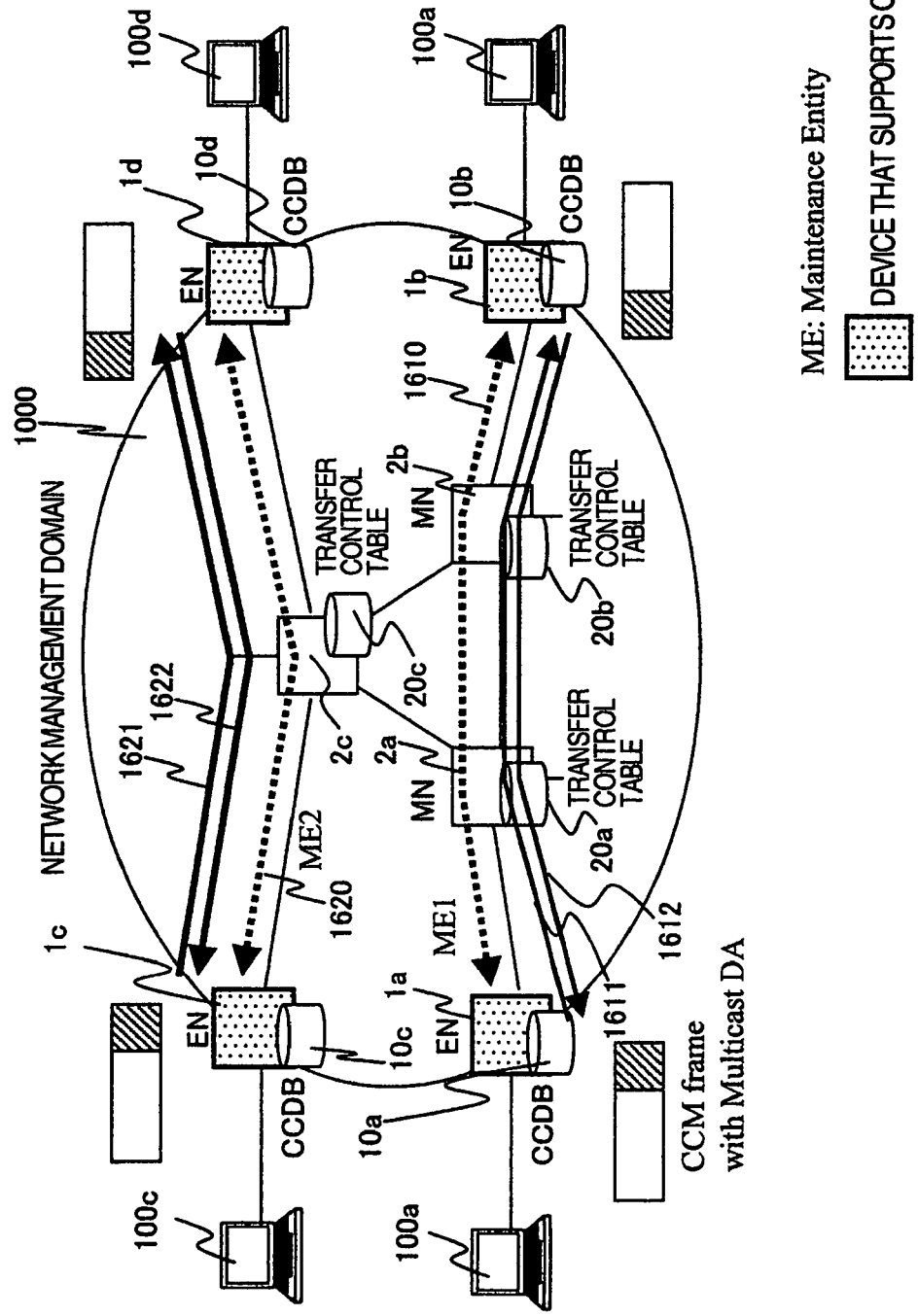
FIG. 16 is an example of a network configuration in the case where a plurality of MEs are configured in a management domain, under the conditions of FIG. 13.
Figure 17:
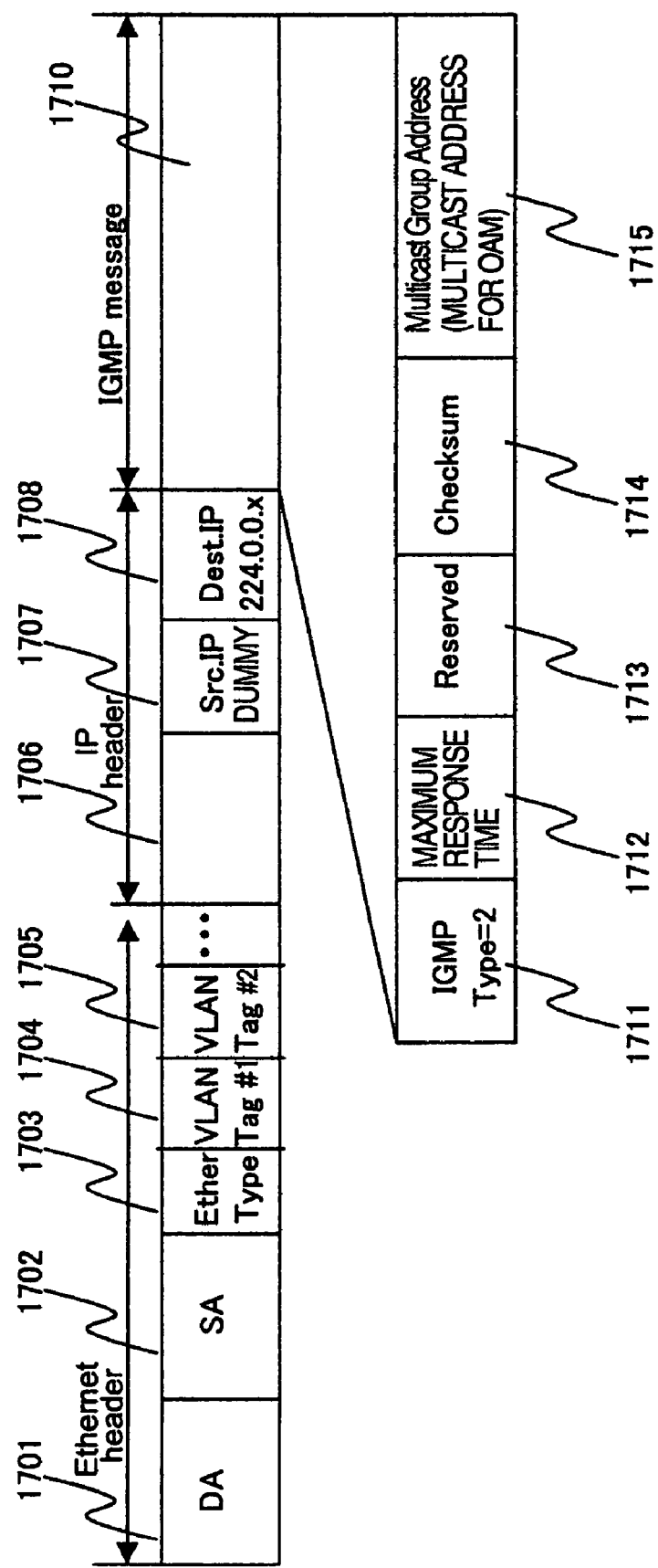
FIG. 17 shows an example of an IGMP/MLD frame that is transmitted from an edge node in FIG. 13 and FIG. 16. Here, an example of a frame configuration compliant with the format of IGMPv2 is shown.
Figures 18, 19:
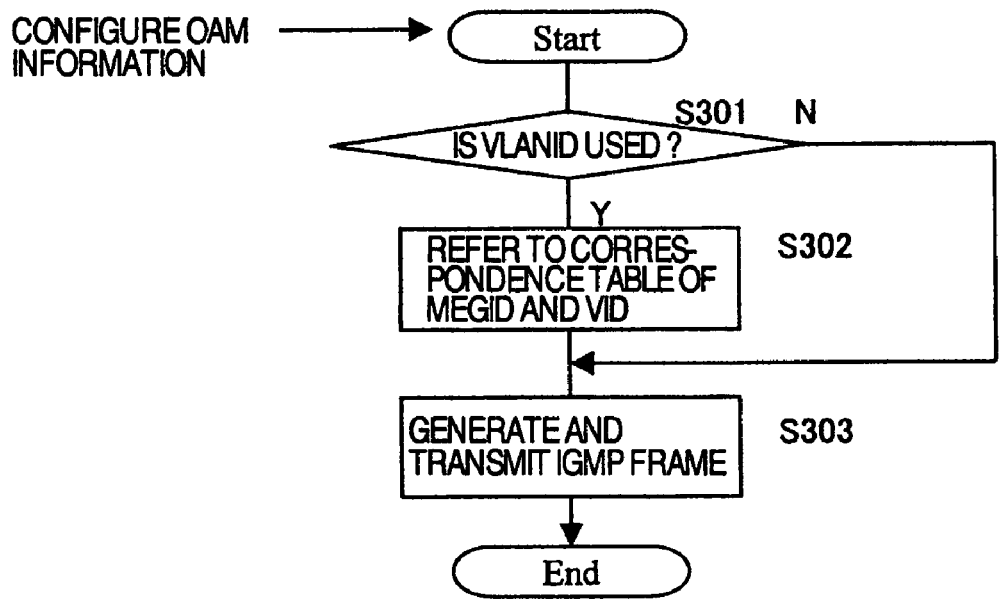
FIG. 18 is a flowchart showing a process flow for generating an OAM route setup frame in an edge node, in the OAM topology of FIG. 13 or FIG. 16.
FIG. 19 is a configuration example of the OAM frame transfer control table retained in a relay node.
Figure 20:
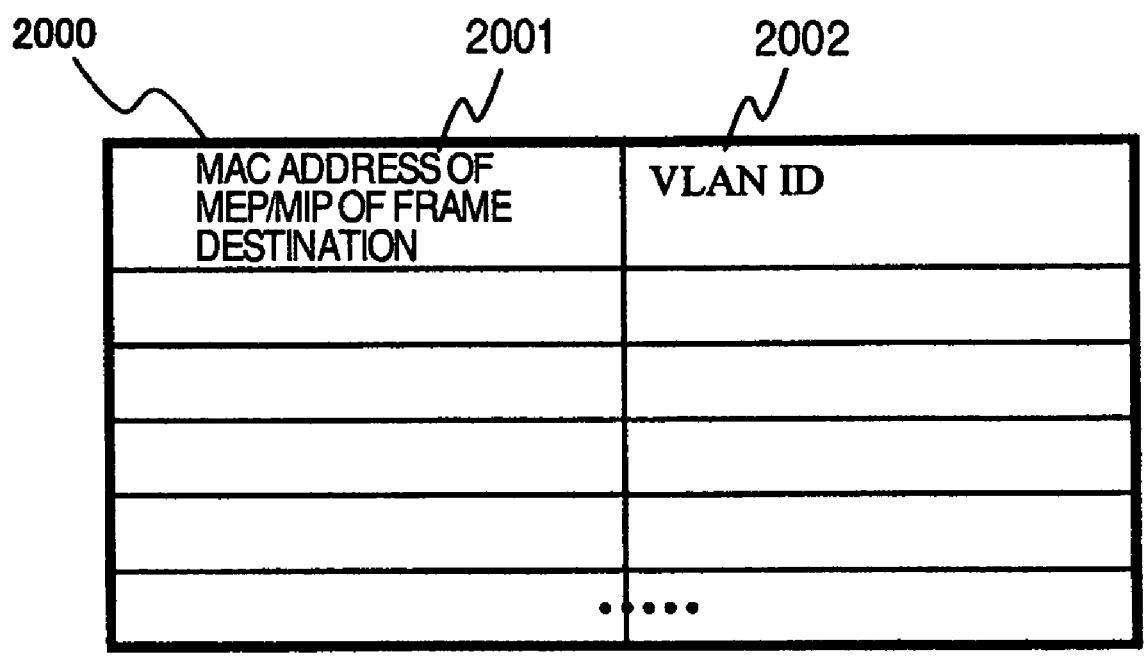
FIG. 20 shows a table for specifying the transfer route for a frame that does not include MEGID in the OAM frame, under the conditions of FIG. 13.
Figure 21:
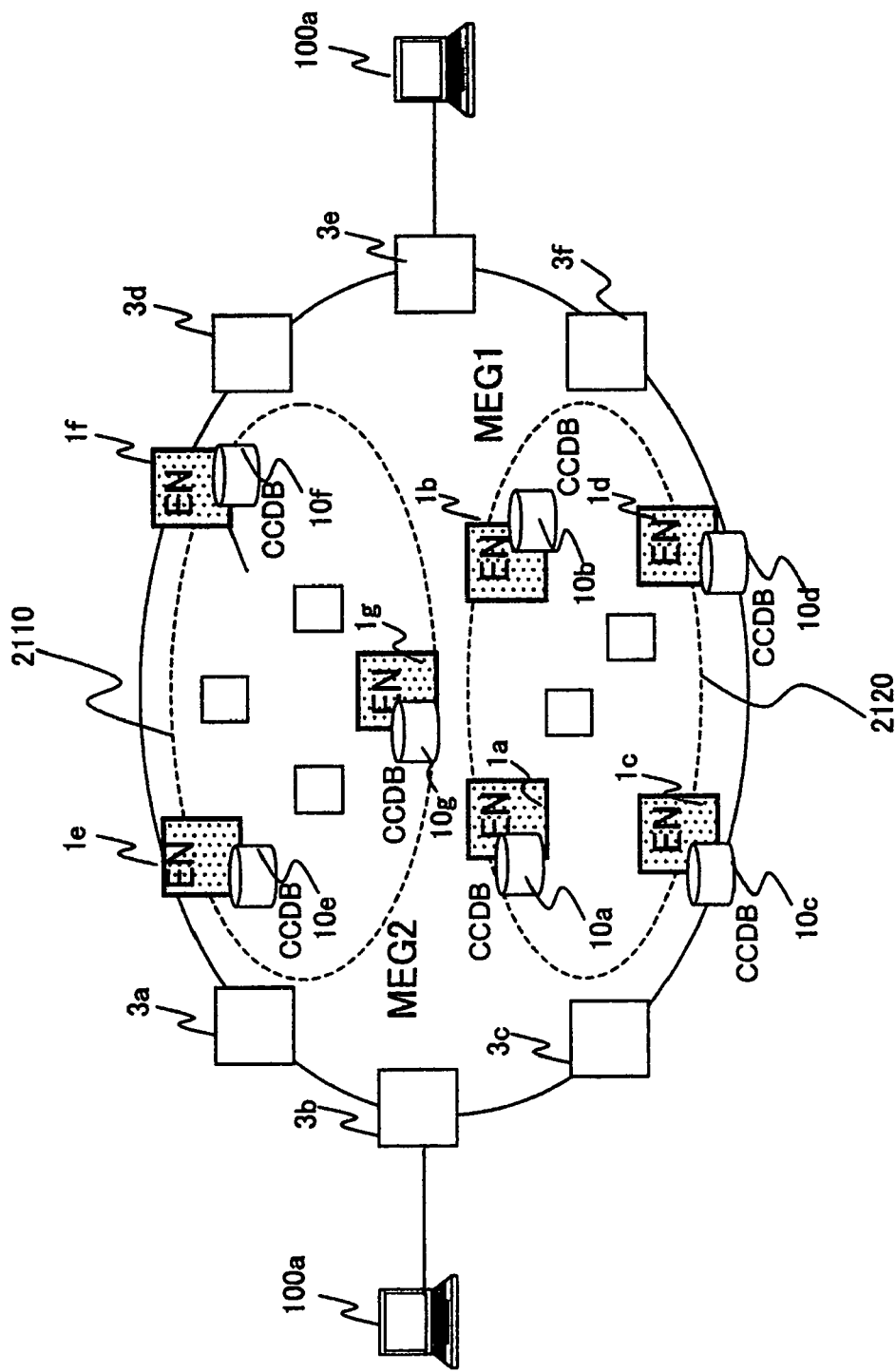
FIG. 21 is an explanatory view showing an implementation method of a hand scanner (Embodiment 2).
Figure 22:
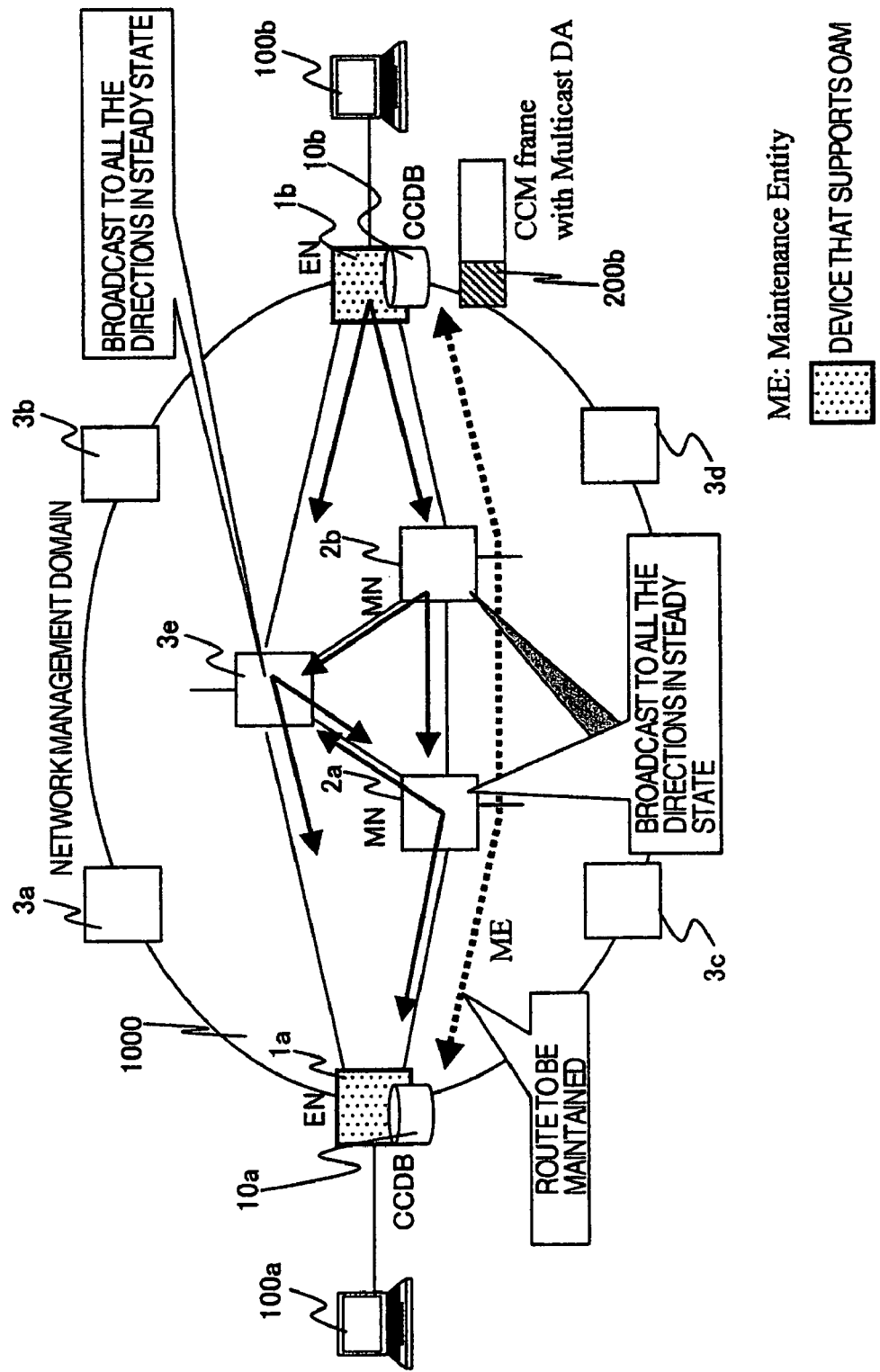
FIG. 22 shows an example of the configuration in the case where the network of FIG. 1 is configured only with the device that does not correspond to Ethernet OAM.
Figure 23:
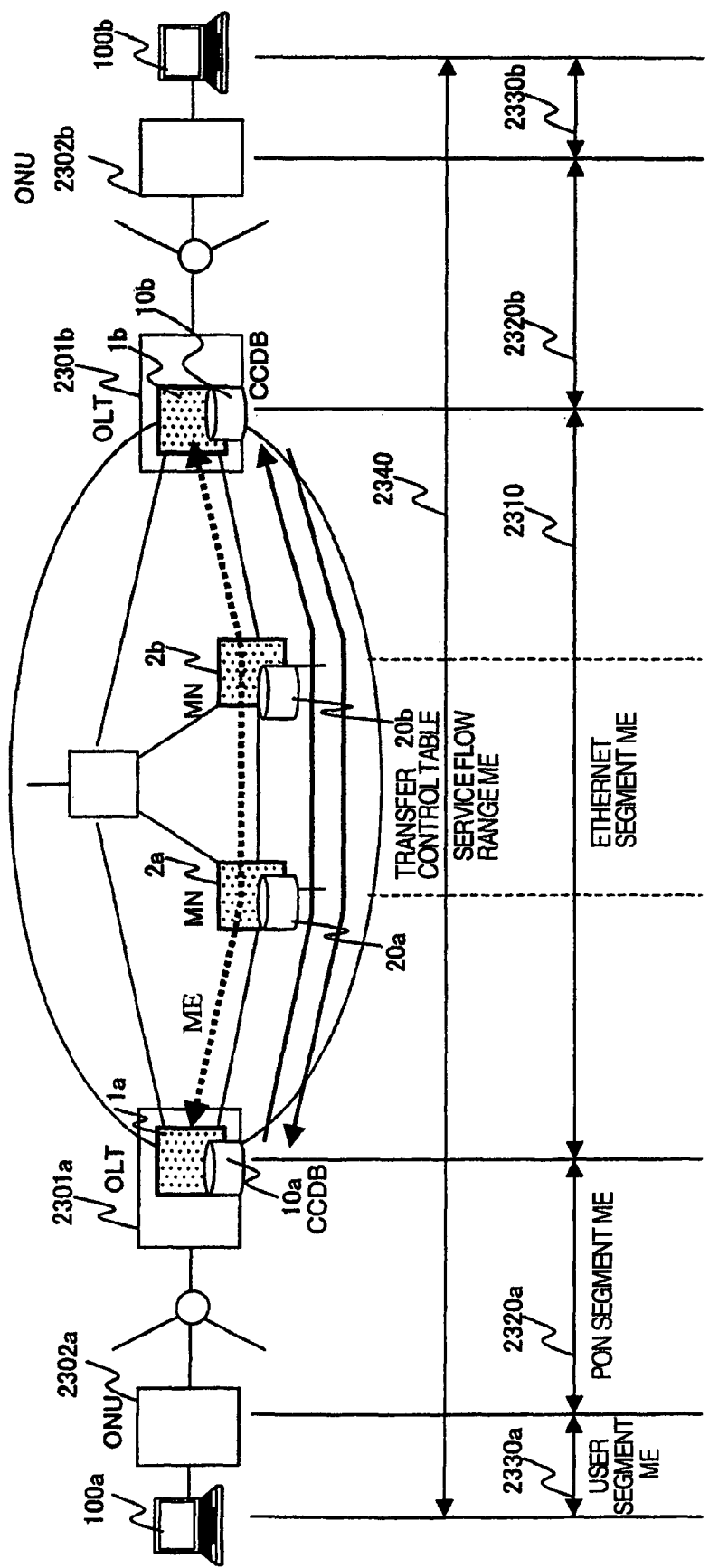
FIG. 23 shows a case including an optical access system (PON; Passive Optical Network), as a configuration example of a network to which Ethernet OAM functions are applied.

As a vehicle for the next generation network (NGN) scheme, and also, as an infrastructure construction product for providing a feeling of reliability and a feeling of security as the next generation infrastructure, the present invention can be applied to the communication devices, such as switches that support Ethernet, and MPLS switches, used for construction of a LAN, an access network, and a metro network.

DESCRIPTION OF THE REFERENCE SYMBOLS

1: edge node
2: relay node
5: relay node that does not support OAM
10, 541, 550: CC database
20, 750: transfer control table
50: transfer control table in a relay node that does not support OAM
1200: MEGID acquisition table
2000: MEGID, VID acquisition table when a relay node that does not support OAM is included

The invention claimed is:
1. A network system comprising:
a first edge node, a second edge node, and a plurality of data transfer devices connected to a network for transferring data from the first edge node to the second edge node via the data transfer devices, wherein:
edge nodes corresponding to at least two of the plurality of data transfer devices configure a transmission route of maintenance/management data having a destination multicast address, a first data transfer device located at an end point of the transmission route of the maintenance/management data comprises a transmission unit for transmitting the maintenance/management data including the destination multicast address and an identifier of the transmission route for transferring the maintenance/management data between the first and second edge nodes, a second data transfer device located at a position other than the end point of the transmission route of the maintenance/management data comprises:
a receiving unit for receiving the maintenance/management data that the first data transfer device located at the end point of the transmission route transmits; and
a storage unit for, in response to receiving the maintenance/management data at the receiving unit:
extracting the identifier of the transmission route from the received maintenance/management data, an identifier of a receiving port that received the maintenance/management data, and the destination multicast address of the maintenance/management data from the received maintenance/management data;
making a correspondence among the extracted identifier of the transmission route, the extracted identifier of the
receiving port, and the extracted destination multicast address;
and storing the correspondence, the extracted identifier of the transmission route, the extracted identifier of the receiving port, and the extracted destination multicast address into the storage unit;
the destination multicast address indicates a maintenance entity level, when the receiving unit receives the maintenance/management data, the storage unit performs the extracting, making, and storing only if the maintenance entity level of the maintenance/management data is equal to a maintenance entity level which is set to the receiving port that received the maintenance/management data, and when other maintenance/management data that has a destination multicast address is received, the other maintenance/management data is transferred to an output port that is different from the receiving port that received the other maintenance/management data, based on the correspondence stored in the storage unit, wherein the output port is associated with the destination multicast address of the other maintenance/management data and an identifier of a transmission route included in the other maintenance/management data, the transmission route of the maintenance/management data has a logical hierarchical structure adapted to a maintenance/management level, and in the storage unit of the second data transfer device, an identifier of a hierarchy to which the received maintenance/management data belongs in the hierarchical structure is stored and associated with the identifier of the transmission route of the received maintenance/manage- ment data and the identifier of the port that received the maintenance/management data in the route information.

2. The network system according to claim 1, wherein the identifier of the transmission route of the maintenance/management data is a management entity group identifier (MEGID).

3. The network system according to claim 1, wherein the maintenance/management data is transferred via a virtual local area network (VLAN), and wherein the identifier of the transmission route of the maintenance/management data is an identifier of the VLAN.

4. The network system according to claim 3, wherein the maintenance/management data is transferred via the VLAN exclusively for the maintenance/management data.

5. The network system according to claim 1, wherein the maintenance/management data is transferred via a multi-protocol label switching (MPLS) network, and wherein the identifier of the transmission route of the maintenance/management data is a label for identifying the transmission route within the MPLS network.

6. The network system according to claim 1, wherein route information stored in the storage unit of the second data transfer device contains information indicative of an expiration date and time of the route information, and wherein upon the expiration date and time passing, the route information is deleted.

7. A data transfer device connected to a network system comprising a plurality of data transfer devices connected to a network, wherein at least two of the plurality of data transfer devices configure a transmission route of maintenance/management data having a destination multicast address, the data transfer device existing on the transmission route and furthermore being located at other than an end point of the transmission route, the data transfer device comprising: a receiving unit for receiving maintenance/management data which another data transfer device that is located at the end point of the transmission route transmits; and a storage unit for, in response to receiving the maintenance/management data at the receiving unit:

extracting the identifier of the transmission route from the received maintenance/management data, an identifier of a receiving port that received the maintenance/management data, and the destination multicast address of the maintenance/management data from the received maintenance/management data;

making a correspondence among the extracted identifier of the transmission route, the extracted identifier of the receiving port, and the extracted destination multicast address; and storing the correspondence, the extracted identifier of the transmission route, the extracted identifier of the receiving port, and the extracted destination multicast address into the storage unit; wherein:

the destination multicast address indicates a maintenance entity level, when the receiving unit receives the maintenance/management data, the storage unit performs the extracting, making, and storing only if the maintenance entity level of the maintenance/management data is equal to a maintenance entity level which is set to the receiving port that received the maintenance/management data, and upon receipt of other maintenance/management data that has a destination multicast address, the data transfer device transmits the other maintenance/management data based on the correspondence stored in the storage unit to an output port that is different from the receiving port that received the other maintenance/management data, wherein the output port is associated with the destination multicast address of the other maintenance/management data and an identifier of a transmission route included in the other maintenance/management data, the transmission route of the maintenance/management data has a hierarchical structure adapted to a maintenance/management level, and an identifier of a hierarchy layer to which the received maintenance/management data belongs in the hierarchical structure is stored and associated with the identifier of the transmission route of the received maintenance/management data and the identifier of the port that received the maintenance/management data in the route information in the storage device.

8. The data transfer device according to claim 7, wherein the identifier of the transmission route of the maintenance/management data is a management entity group identifier (MEGID).

9. The data transfer device according to claim 7, wherein the maintenance/management data is transferred via a virtual local area network (VLAN), and wherein the identifier of the transmission route of the maintenance/management data is an identifier of the VLAN.

10. The data transfer device according to claim 9, wherein the maintenance/management data is transferred via the VLAN exclusively for the maintenance/management data.

11. The data transfer device according to claim 7, wherein the maintenance/management data is transferred via a multi-protocol label switching (MPLS) network, and wherein the identifier of the transmission route of the maintenance/management data is a label for identifying the transmission route within the MPLS network.

12. The data transfer device according to claim 7, wherein the route information stored in the storage unit contains information indicative of an expiration date and time of the route information, and wherein upon the expiration date and time passing, the route information is deleted.

13. A data transfer device connected to a network system comprising a plurality of data transfer devices connected to a network, wherein at least two of the plurality of data transfer devices constitute a transmission route of maintenance/management data having a destination multicast address, the data transfer device existing on the transmission route and furthermore being located at an end point of the transmission route, the data transfer device comprising:

a receiving unit for receiving maintenance/management data which another data transfer device that is located at the end point of the transmission route transmits; and a storage unit for, in response to receiving the maintenance/management data at the receiving unit:

extracting a management entity group identifier (MEGID) from the maintenance/management data, an identifier of a receiving port that received the maintenance/management data, and the destination multicast address of the maintenance/management data from the received maintenance/management data;

making a correspondence among the extracted MEGID, the extracted identifier of the receiving port, and the extracted destination multicast address; and storing the correspondence, the extracted MEGID, the extracted identifier of the receiving port, and the extracted destination multicast address into the storage unit; wherein:

the destination multicast address indicates a maintenance entity level, when the receiving unit receives the maintenance/management data, the storage unit performs the extracting, making, and storing only if the maintenance entity level of the maintenance/management data is equal to a maintenance entity level which is set to the receiving port that received the maintenance/management data, and when other maintenance/management data that has a destination multicast address is received, the other maintenance/management data is transferred to an output port that is different from the receiving port that received the other maintenance/management data, based on the correspondence stored in the storage unit, wherein the output port is associated with the destination multicast address of the other maintenance/management data and an identifier of a transmission route included in the other maintenance/management data, the transmission route of the maintenance/management data has a hierarchical structure adapted to a maintenance/management level, and an identifier of a hierarchy layer to which the received maintenance/management data belongs in the hierarchical structure is stored and associated with the identifier of the transmission route of the received maintenance/management data and the identifier of the port that received the maintenance/management data in the route information in the storage device.

14. The data transfer device according to claim 13, wherein the data transfer device is an optical line terminal (OLT) configuring an optical access system.

* * * * *